US008429384B2

(12) United States Patent
Pennock et al.

(10) Patent No.: US 8,429,384 B2
(45) Date of Patent: Apr. 23, 2013

(54) INTERLEAVED HARDWARE MULTITHREADING PROCESSOR ARCHITECTURE

(75) Inventors: James D. Pennock, Salt Lake City, UT (US); Ronald Baker, Sandy, UT (US); Brian R. Parker, West Valley City, UT (US); Christopher Belcher, Lehi, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 449 days.

(21) Appl. No.: 11/599,732

(22) Filed: Nov. 15, 2006

(65) Prior Publication Data

US 2008/0016321 A1 Jan. 17, 2008

Related U.S. Application Data

(60) Provisional application No. 60/830,166, filed on Jul. 11, 2006.

(51) Int. Cl.
*G06F 9/38* (2006.01)
*G06F 15/76* (2006.01)

(52) U.S. Cl.
USPC .............................. 712/35; 712/219; 712/221

(58) Field of Classification Search .................. 712/35, 712/219, 221
See application file for complete search history.

(56) References Cited

U.S. PATENT DOCUMENTS

| 4,025,771 | A | * | 5/1977 | Lynch et al. ................ 708/521 |
| 4,075,688 | A | * | 2/1978 | Lynch et al. ................ 711/200 |
| 5,542,059 | A | * | 7/1996 | Blomgren ..................... 712/41 |
| 5,551,001 | A | * | 8/1996 | Cohen et al. ................. 711/122 |
| 5,734,808 | A | * | 3/1998 | Takeda ......................... 345/419 |
| 5,905,881 | A | * | 5/1999 | Tran et al. ..................... 712/219 |
| 5,927,218 | A | | 7/1999 | Tretter |
| 5,933,651 | A | * | 8/1999 | Masuda et al. .................. 712/42 |
| 5,973,705 | A | * | 10/1999 | Narayanaswami ........... 345/505 |
| 6,052,792 | A | * | 4/2000 | Mensch, Jr. ................... 713/322 |
| 6,163,839 | A | * | 12/2000 | Janik et al. .................... 712/219 |
| 6,195,665 | B1 | * | 2/2001 | Jarett ............................. 715/251 |
| 6,247,115 | B1 | * | 6/2001 | Janik et al. .................... 712/219 |
| 6,295,601 | B1 | * | 9/2001 | Steele, Jr. ...................... 712/244 |

(Continued)

FOREIGN PATENT DOCUMENTS

| DE | 195 29 718 A1 | 2/1997 |
| EP | 1 517 331 A1 | 3/2005 |
| WO | WO 03/003237 A2 | 1/2003 |
| WO | WO 2005/069121 A1 | 7/2005 |

OTHER PUBLICATIONS

Random House Dictionary, © 2011, www.dictionary.com search term: Interleave.*

(Continued)

*Primary Examiner* — Aimee Li
(74) *Attorney, Agent, or Firm* — Brooks Kushman P.C.

(57) ABSTRACT

An architecture for a digital signal processor alleviates the difficulties and complexities normally associated with writing and optimizing programs to avoid stalls during which one instruction awaits the result of a prior instruction. The architecture coordinates the processing of data for multiple instructions through a multiple stage data pipeline. As a result, the architecture not only supports simultaneous execution of multiple programs, but also permits each program to execute without delays caused by inter-relationships between instructions within the program.

31 Claims, 17 Drawing Sheets

U.S. PATENT DOCUMENTS

| | | | |
|---|---|---|---|
| 6,351,805 B2 * | 2/2002 | Janik et al. | 712/219 |
| 6,421,274 B1 | 7/2002 | Yoshimura | |
| 6,462,743 B1 | 10/2002 | Battle | |
| 6,477,637 B1 * | 11/2002 | Arimilli et al. | 712/218 |
| 6,553,485 B2 * | 4/2003 | Janik et al. | 712/219 |
| 6,700,410 B2 * | 3/2004 | Ebergen | 326/93 |
| 7,653,804 B2 * | 1/2010 | Lenart et al. | 712/18 |
| 2002/0056034 A1 | 5/2002 | Gearty et al. | |
| 2006/0212853 A1 * | 9/2006 | Sutardja | 717/131 |
| 2007/0073798 A1 * | 3/2007 | Donofrio et al. | 708/523 |
| 2007/0074008 A1 * | 3/2007 | Donofrio | 712/222 |

OTHER PUBLICATIONS

John L. Hennessy and David A. Patterson, "Pipelining: Basic and Intermediate Concepts" Appendix A, pp. A2-A81, Computer Architecture a Quantitative Approach, Third Edition, 2003.

John L. Hennessy and David A. Patterson, "Enhancing Performance with Pipelining" Chapter 6, pp. 436-536, Computer Organization & Design, Second Edition, 1997.

\* cited by examiner

Phase 2     Figure 5     Phase 3

INTERLEAVED HARDWARE MULTITHREADING PROCESSOR ARCHITECTURE

BACKGROUND OF THE INVENTION

1. Priority Claim

This application claims the benefit of priority from U.S. Provisional Patent Application No. 60/830,166 filed 11 Jul. 2006.

2. Technical Field

This disclosure relates to a digital signal processing architecture. In particular, this disclosure relates to a pipelined digital signal processing architecture.

3. Related Art

The relentless pursuit of speed and throughput has driven microprocessor architectures through many significant increases in complexity and has yielded many significant architectural enhancements. A limitation to the speed of a microprocessor architecture is the settling time of the digital circuitry between register states. One enhancement to increase microprocessor architecture speed is the pipeline. The pipeline increases processor speed by subdividing major sections of circuitry into pipeline stages to reduce the digital circuit settling time (e.g., an instruction decode stage and an instruction execution stage) and allow the clock speed to increase.

But, by introducing pipeline stages into the architecture there also arise partially completed instructions that will not be finally resolved until they propagate through the entire pipeline. These partially completed instructions can have a negative impact on the processing efficiency by creating pipeline stalls (i.e. unused pipeline stages) for instructions that need a completed result of a previous instruction before being able to complete. A pipeline stall is one or more unused execution cycles within the pipeline that delays the execution of a program instruction until the result of a prior instruction is ready for the currently executing program instruction.

In an effort to avoid pipeline stalls, immense amounts of time, cost, and other resources were consumed to arrive at coding techniques and compilers that were able to optimize a program to run with fewer stalls. For example, some compilers attempted to reorganize program instructions to eliminate interdependencies between instructions that lead to stalls. However, reorganizing the program was not possible in every instance. Furthermore, even if the program or a portion of the program could be reorganized, the resulting scrambled code was invariably difficult to read, understand, and maintain.

There is a need for an improved pipelined processing architecture.

SUMMARY

A pipelined processing architecture for a digital signal processor (or microcontroller, microprocessor, or other processor) relieves programmers and compilers from the complexities associated with optimizing a program to avoid instruction stalls. In addition, the architecture provides true simultaneous hardware execution of multiple programs by implementing a pipelined machine state. The architecture coordinates the processing of data through a multiple stage data pipeline. The architecture ensures that results generated by a prior instruction for a given program are complete and available to a subsequent instruction of the program. As a result, the architecture not only supports simultaneous execution of multiple programs, but also permits each program to execute without delays caused by data or address dependencies among instructions within the program.

The pipelined processing architecture includes an instruction data pipeline and a machine state pipeline connected to the instruction pipeline. The instruction data pipeline defines multiple data pipeline stages. As one example, the instruction data pipeline may define an address generation pipeline stage, a data access pipeline stage, a multiply pipeline stage, and an accumulate pipeline stage.

The machine state pipeline provides each data pipeline stage with the machine state applicable to the program and data that the data pipeline stage manipulates. As each data pipeline stage changes to a different program, the machine state pipeline provides each data pipeline state with the proper machine state for executing the program. The machine state pipeline may define a pipelined machine state that includes, as examples, a program counter state, address state, and a data state.

BRIEF DESCRIPTION OF THE DRAWINGS

The disclosure can be better understood with reference to the following drawings and description in which

FIG. 1 shows a pipelined processing architecture that includes a pipelined machine state.

FIG. 2 shows a block diagram of a digital signal processor that incorporates a pipelined processing architecture.

FIG. 3 shows phase 1 of the pipelined processing architecture.

FIG. 4 shows phase 2 of the pipelined processing architecture.

FIG. 5 shows phase 3 of the pipelined processing architecture.

FIG. 6 shows phase 4 of the pipelined processing architecture.

FIG. 7 shows a portion of a machine state pipeline for program counter state data in phase 3 of the pipelined processing architecture.

FIG. 8 shows a portion of a machine state pipeline for program counter state data in phase 4 of the pipelined processing architecture.

FIG. 9 shows portions of a machine state pipeline for program counter state data in phase 1 and phase 2 of the pipelined processing architecture.

FIG. 10 shows additional logic in the machine state pipeline in phase 3 and phase 4 of the pipelined processing architecture.

FIG. 11 shows the acts taken to implement and execute a pipelined processing architecture with a pipelined machine state.

FIG. 12 shows a digital signal processor that includes a memory update engine.

FIG. 13 shows host registers for a memory update engine.

FIG. 14 shows the acts taken by the memory update engine.

FIG. 15 shows a memory update engine interfaced to Z-RAM and C-RAM.

FIG. 16 shows a memory update engine interfaced to microcode memory.

FIG. 17 shows multiplexer logic for selecting between multiple data values to apply to a memory.

DETAILED DESCRIPTION OF THE PREFERRED EMBODIMENTS

The description below generally refers to FIGS. 1-11 in connection with a pipelined processor architecture. In addition, the description below generally refers to FIGS. 12-17 in connection with a dynamic instruction and data updating architecture. While the pipelined processing architecture and the updating architecture may be used in conjunction with one another, either architecture may be implemented without the other.

Figure 1:
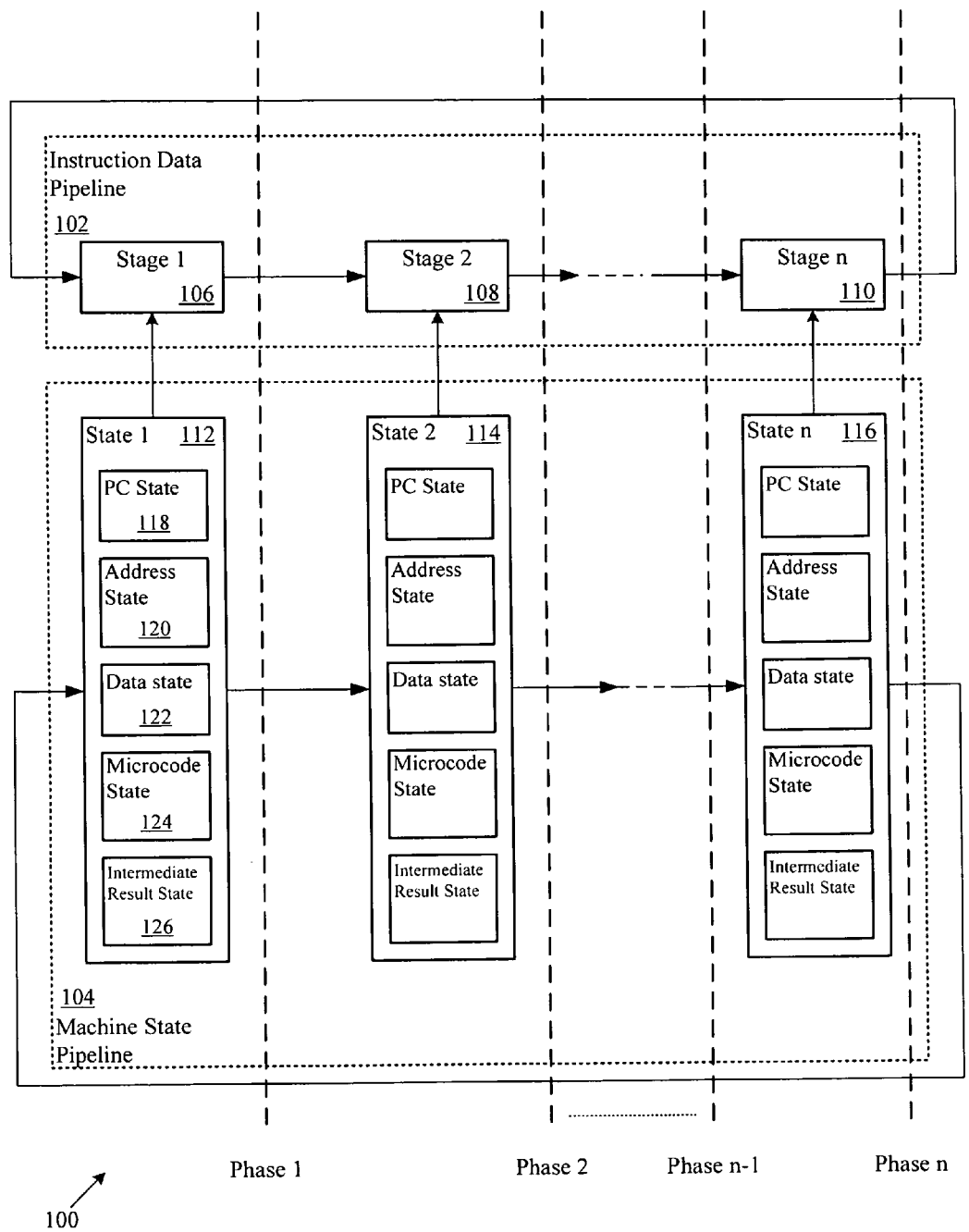
FIGS. 1-11 show a pipelined processor architecture.

FIG. 1 shows a pipelined processing architecture 100 ("architecture 100"). The architecture 100 includes an instruction data pipeline 102 and a machine state pipeline 104. The machine state pipeline 104 provides relevant machine state to each of the data pipeline stages in the instruction data pipeline 102. FIG. 1 also shows multiple phases, phases 1 through n, defined in the architecture 100. Each phase may represent a discrete set of pipeline processing in the architecture 100 (e.g., a set of processing that completes in one clock cycle), including the machine state applicable for that processing.

The instruction data pipeline 102 includes 'n' data pipeline stages. Three of the data pipeline stages are labeled in FIG. 1: the first data pipeline stage 106, the second data pipeline stage 108, and the nth data pipeline stage 110. Each data pipeline stage may implement any desired processing. As examples, the data pipeline stages may include an instruction fetch pipeline stage, and instruction decode pipeline stage, an address pipeline stage, a multiply pipeline stage, and accumulate pipeline stage, a data pipeline stage, or any other pipeline stage. In general, the data pipeline stages connect in series to provide start to finish processing data as directed by a program instruction. Each data pipeline stage may be established so that the processing implemented by that data pipeline stage completes in one clock cycle. In the example discussed below, stage 1 implements an address generation pipeline stage, stage 2 implements a data access pipeline stage, stage 3 implements a multiply pipeline stage, and stage 4 implements an accumulate pipeline stage. However, the architecture 100 may implement additional, fewer, or different types of processing in the same or different order in additional, fewer, or different data pipeline stages.

The machine state pipeline 104 includes 'n' pipelined machine states through which state data propagates down the machine state pipeline 104. Three of the pipelined machine states are labeled in FIG. 1: the first pipelined machine state 112, the second pipelined machine state 114, and the nth pipelined machine state 116. Typically, there are as many pipelined machine states as there are data pipeline stages.

The machine state pipeline 104 connects to the instruction data pipeline 102 to provide the applicable machine state for each program executed in each instruction data pipeline stage. The machine state pipeline 104 includes series connected register sections that propagate the machine state down the machine state pipeline 104 to provide the applicable machine state for each data pipeline stage. As a result, each data pipeline stage becomes an independent pipelined machine.

In one implementation, the instruction data pipeline 102 is a four stage data pipeline. The four data pipeline stages include an address generation pipeline stage, a data access pipeline stage, a multiply pipeline stage, and accumulate pipeline stage. However, additional, fewer, or different data pipeline stages may be implemented.

Each data pipeline stage independently operates on different data and cannot stall because of the unavailability of intermediate results. The intermediate results for each program have propagated through the entire pipeline and are ready for the next instruction for that program. Table 1, below, shows the four stage instruction data pipeline as it initially fills with data flowing through the pipeline. In Table 1, the notation Pij refers to data for the $i^{th}$ program and the $j^{th}$ instruction in that program. In other words, the architecture 100 sequentially loads the four state instruction data pipeline 102 with data for different programs and simultaneously executes instructions from four different programs.

TABLE 1

| | Phase | | | |
|---|---|---|---|---|
| Clock | 1<br>Address | 2<br>Data | 3<br>Multiply | 4<br>Accumulate |
| 1 | P11 | | | |
| 2 | P21 | P11 | | |
| 3 | P31 | P21 | P11 | |
| 4 | P41 | P31 | P21 | P11 |

With the pipeline full of data from different programs, the architecture 100 proceeds to add the data for the next instruction of each program to the pipeline on subsequent clocks. Table 2 below shows several iterations of the next several instructions.

TABLE 2

| | Phase | | | |
|---|---|---|---|---|
| Clock | 1<br>Address | 2<br>Data | 3<br>Multiply | 4<br>Accumulate |
| 5 | P12 | P41 | P31 | P21 |
| 6 | P22 | P12 | P41 | P31 |
| 7 | P32 | P22 | P12 | P41 |
| 8 | P42 | P32 | P22 | P12 |
| 9 | P13 | P42 | P32 | P22 |
| 10 | P23 | P13 | P42 | P32 |

Table 2 shows that when the data P12 enters the address phase, the data for the prior instruction from program 1, P11, has exited the pipeline. As a result, the P11 data (e.g., an address calculation performed in the accumulate pipeline stage) are complete and available to the next instruction in the program. Program 1 never stalls because the results of the prior instruction from program 1 are always complete when the subsequent instruction begins execution. The same is true for all four programs. The next instruction in each program always has available the complete results of the prior instruction from that program. The instructions of each of four programs are interleaved in execution, with 'n' clocks between subsequent instructions of the same program. The 'n' clock interval permits data for each instruction to completely clear the pipeline, so that any subsequent data for an instruction from the same program will have the results it may need from a prior instruction.

One beneficial result is that a programmer, compiler, or assembler need not expend the resources to optimize code to avoid pipeline stalls. The program cannot stall because the architecture 100 coordinates the execution of instructions from three other programs while the data for the instruction from the first program makes its way completely through the pipeline. In this way, the architecture 100 simultaneously executes multiple different programs and implements true interleaved hardware multithreading.

The interleaving and the architecture 100 are not limited to four phases or data pipeline stages. Instead, the architecture 100 may implement additional, fewer, or different phases or data pipeline stages. For example, an additional data pipeline stage may be added to one or both of the multiply pipeline stage or the accumulate pipeline stage.

Tables 1 and 2 show that each data pipeline stage in the architecture 100 changes to data from a different program on each clock. For example, the multiply pipeline stage operates on P12 data, the P22 data, then P32 data, then P42 data. The architecture provides each data pipeline stage with a mechanism for keeping track of the execution state of each program: a pipelined machine state. The machine state flows down the machine state pipeline 104 on each clock. As a result, as each data pipeline stage transitions to processing data for a different program, the pipelined machine state conveys the proper execution context to the data pipeline stage. The data pipeline stage thereby continues executing each program without losing track of the context (e.g., the accumulators, addresses, and program counters) in which each program was executing.

In other words each stage of the instruction data pipeline 102 effectively becomes its own pipelined machine. To that end, the architecture 100 defines, maintains, and makes available a current machine state to each pipelined machine on each clock. In the example shown in the Figures and described below, the first machine does an address fetch while machine two does its data fetch. At the same time, machine three is performing a multiplication, while machine four is performing an accumulate operation (or logical operation). The architecture 100 therefore handles multiple truly simultaneous hardware threads.

The architecture 100 interfaces to a memory system. In one alternative, the memory system includes a data memory and a coefficient memory. However, the memory system may include additional, fewer, or different memories implemented with DRAM, SRAM, or any other memory technology. The discussion below describes an architecture 100 that interfaces to a data memory, termed a Z-RAM, and a coefficient memory, termed a C-RAM. While the Z-RAM and the C-RAM often store data values and coefficients to multiply against the data values, respectively, the Z-RAM and the C-RAM may store any type of data. Below, the data memory index register into the Z-RAM is denoted Zi, while the coefficient memory index register into the C-RAM is denoted Ci.

The pipelined machine state may include a Program Counter (PC) state 118, Address state 120, and Data state 122. The PC state 118 may establish and maintain a program counter for each data pipeline stage. The PC state 118 may further include return addresses, branch addresses, loop size data, loop position data, loop counter data, or other loop implementation data. The Address state 120 may include one or more Z-RAM indices (e.g., a Zi register), one or more C-RAM indices (e.g., a Ci register), or other address data. The Data state 122 may include flags, accumulators, or other data for each pipeline stage. The accumulators in the Data state 122 may include an A accumulator, B accumulator, C accumulator, a shift code register, and a MAC accumulator. Additional, fewer, or different accumulators may he established as part of the pipelined Data state 122.

The pipelined machine state may include additional, different, or fewer states than those identified above. For example, the pipelined machine state may also include a Microcode state 124 and an Intermediate Result state 126. The Microcode State 124 includes microcode instruction bits that propagate down registers in the machine state pipeline 104 for use in subsequent data pipeline stages. The Intermediate Result state 126 includes flags, control bits, or other intermediate results decoded or otherwise determined in one data pipeline stage that propagate down registers in the machine state pipeline 104 for use in subsequent data pipeline stages.

The flags in the pipelined machine state may specify condition codes and the bit inversions of the condition codes. Examples of condition codes include Z (zero), P (positive), N (negative), and O (overflow). The condition codes are set in the accumulate pipeline stage. The Data state may further include shift codes (stored, for example, in a shift code register). The shift codes may specify how many positions to shift, and a direction to shift, any result produced in the accumulate pipeline stage.

Figure 2:
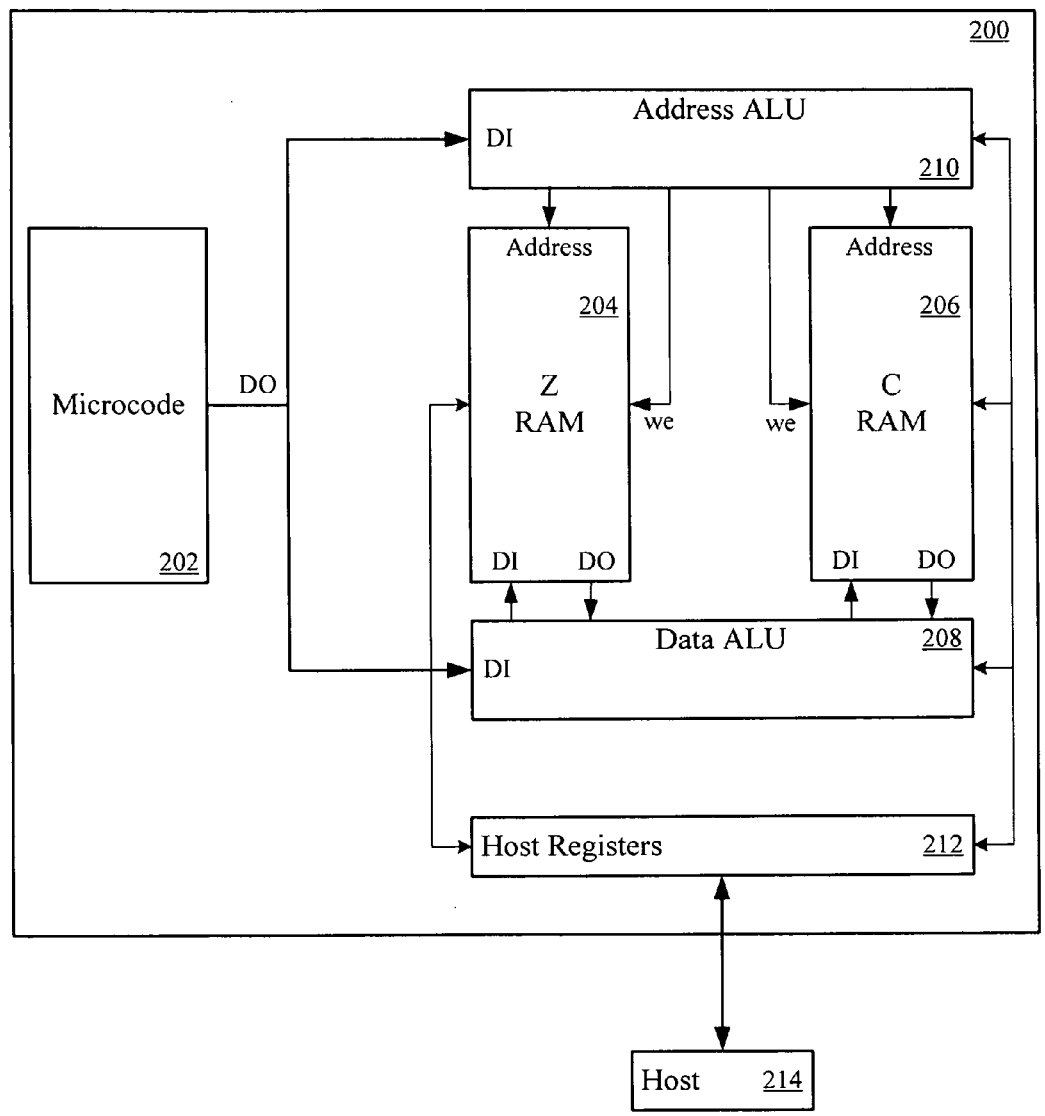

FIG. 2 shows a block diagram of a digital signal processor 200 that may incorporate the architecture 100. The processor 200 includes a microcode memory 202, a Z-RAM 204, and a C-RAM 206. The processor 200 also includes a data ALU 208 and an address ALU 210. Host registers 212 implement a bidirectional communication interface between the processor 200 and the host 214. The host 214 may be an onboard microcontroller, an external controller, or remote computer system as examples. In one implementation, the host registers 212 define one or more memory locations that the host 214 reads and the processor 200 writes, and one or more memory locations that the host 214 writes and the processor 200 reads. The host 214 and processor 200 may read and write the host registers 212 at their own independent rates. The host registers 212 may be defined in the host memory space or other memory spaces, and other types of communication interfaces may be implemented between the processor 200 and the host 214. Furthermore, some host registers 212 may provide control bits to the processor 200, rather than, or in addition to, providing general purpose read/write memory storage. Accordingly, on the host side, the host 214 writes to selected host registers to provide, on the architecture side, control signals to the processor 200.

The microcode memory 202 stores the microcode instructions that implement the instruction set supported by the processor 200. The microcode memory 202 may vary widely in size and width. For example, the microcode memory may be 1K-4K by 8-128 bits wide, 2K-3K by 32-64 bits wide, or may adhere to any other organization depending on the implementation desired.

The Z-RAM 204 and the C-RAM 206 are provided for program flexibility in storing and retrieving data. Other implementations may include only the Z-RAM 204, the C-RAM 206, or additional or different memories. Furthermore, the Z-RAM 204 or the C-RAM 206 may be included in memory spaces with other memories, such as the host registers 212, external memory address buffers, external memory data buffers, input/output data buffers, or other memories. Any of the buffers may be implemented using double buffered memory techniques that provide full read and write functionality out of and into the buffer for the circuitry on both "sides" of the buffer.

The Z-RAM 204 and the C-RAM 206 may vary widely in organization. For example, the Z-RAM 204 and the C-RAM 206 may be 1K-4K by 8-128 bits wide, 2K by 32-64 bits wide, or may have any other organization depending on the implementation desired.

The data ALU 208 implements the instruction data pipeline 102. In particular, the data ALU 208 may define four data pipeline stages: an address generation pipeline stage, a data access pipeline stage, a multiply pipeline stage, and an accumulate pipeline stage. The address generation pipeline stage sets up the addresses, as examples, for addressing C-RAM 206 and Z-RAM 204, for saving results in memory or in accumulators, or for any other addressing. Data from the memories is read during the data access pipeline stage. During the multiply pipeline stage, a multiplier in the data ALU 208 forms the product of multiple data elements obtained during the data stage. During the accumulate pipeline stage, the data ALU 208 sums multiple data elements (including, for example, the product formed in the multiply stage), or performs logical operations on data elements.

The address ALU 210 implements a portion of the machine state pipeline 104. In particular, the address ALU implements specific addressing modes and provides a pipeline to track the address portion of the execution context of each program. The addressing modes include a direct addressing mode and indirect addressing modes.

The direct addressing mode allows the microcode instruction to directly specify the address to be accessed. The indirect modes allow the processor 200 to access memory at a base address plus an offset specified in the microcode instruction. For example, the indirect mode may determine an address by adding an offset specified in the microcode instruction to the Zi register or Ci register. In addition, the indirect modes also implement pre-modify and post-modify addressing. Accordingly, the address ALU 210 supports modifying (e.g., incrementing or decrementing by 1) the Zi register and the Ci register before or after the Zi register or Ci register is used.

The architecture 100 may run on a master clock. The master clock may be a selectable multiple of a sampling rate. For example, for audio applications, the master clock may run at a multiple (e.g., 3000) of a 44.1 KHz audio sampling rate or any other sampling rate.

Figure 3:
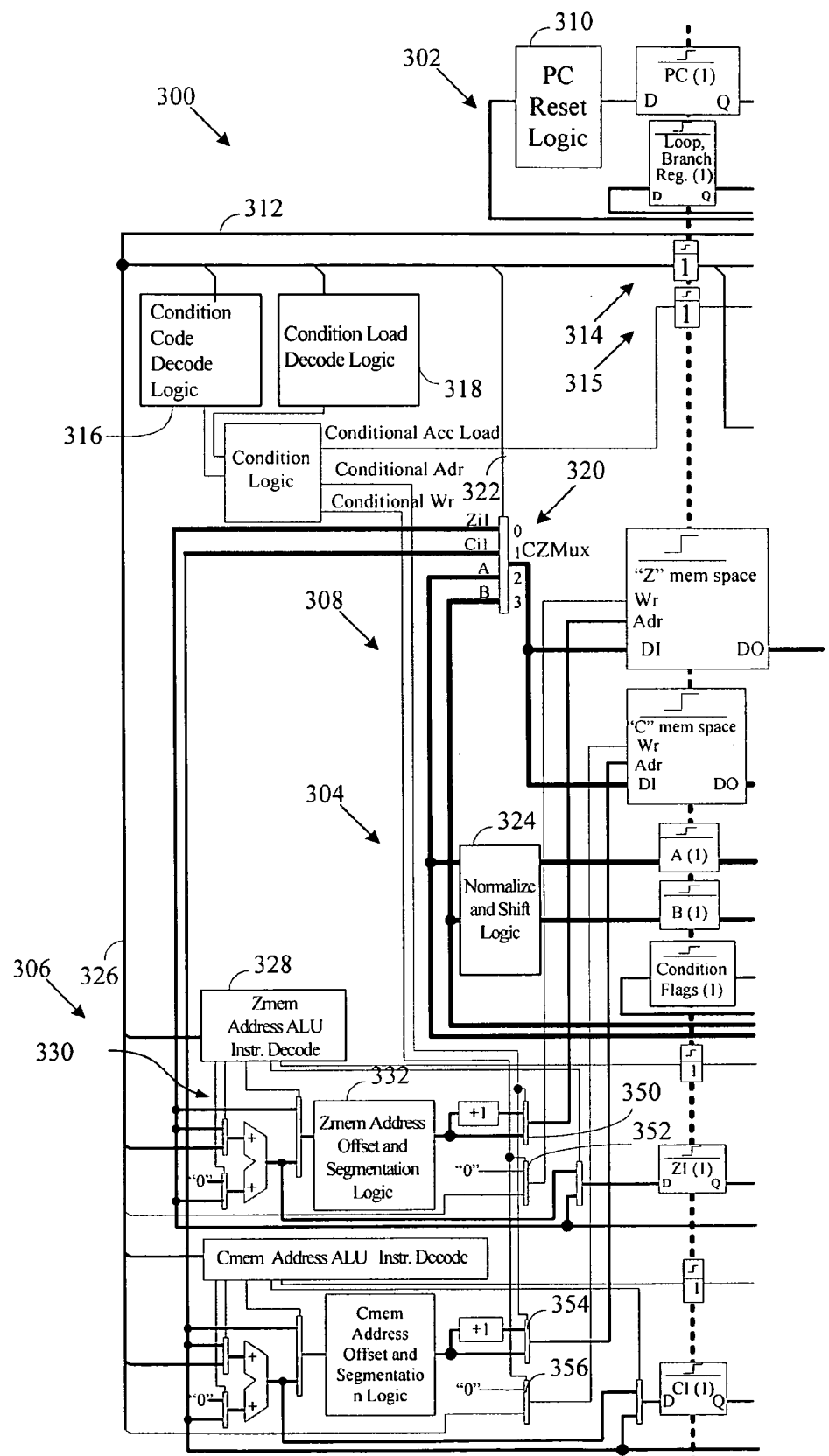

FIG. 3 shows the first phase 300 ("phase 1") of the architecture 100. Phase 1 includes a portion of the machine state pipeline 104, including a program counter state section 302, a data state section 304 and an address state section 306. Phase 1 also includes a portion of the instruction data pipeline 102, including the address generation pipeline stage 308. The dashed line shows the end of phase 1 in the architecture 100, while the logic to the left of the dashed line shows the logic included in phase 1. In other words, the dashed line shows where an internal clock latches address data into registers or provides the address information to memories in order to begin retrieving data from the memories or store data into the registers to setup for phase 2.

In the program counter state section 302, the program counter reset logic 310 determines whether to restart the program counter, to continue at the next location in the microcode program, or to load a new program counter value. The program counter reset logic may be provided in each phase to coordinate execution of the programs executed in each phase. The microcode program, the host 214, or another entity may provide a program counter restart signal. The program counter state section 302 may define not only a program counter, but also looping registers. The looping registers may track loop size, loop position, a loop counter, a branch position, a return position, or other loop characteristics.

The current microcode instruction provided on the microcode data line 312 provides control bits for the phase 1 logic. Any of the microcode bits or results determined in phase 1 may be stored in microcode pipeline registers or result pipeline registers and passed along down the pipeline for use in subsequent phases. FIG. 3 shows an example of a pipelined microcode register 314 and a result pipeline register 315 for the decoded conditional accumulator load signal.

The microcode instruction provides control bits to the condition code decode logic 316 and at the condition load decode logic 318. The condition code decode logic 316 and the condition load decode logic 318 determine on what conditions and to what registers or other memory spaces results should be written. For example, the microcode control bits may specify no condition, conditional accumulator loading, conditional memory addressing or conditional memory writing. The microcode control bits may also specify that the conditional actions should occur based on a negative or not negative, a positive or not positive, a zero or not zero, or an overflow or not overflow condition.

The address generation pipeline stage 308 includes the multiplexer 320. The multiplexer 320 selects between multiple data elements to provide to the Z-RAM 204 and the C-RAM 206. The microcode instruction provides control bits on the multiplexer selection input 322. The multiplexer 320 selects between a Zi input, a Ci input, an A accumulator input, and a B accumulator input. However in other implementations, the multiplexer 320 may select between additional, fewer, or different inputs. As examples, the multiplexer 320 may also provide a selection between constants such as '0', '1', and '−1', additional or different accumulators, data from the host registers 212, specific bits of other registers or accumulators or any other input data elements. Accordingly, the multiplexer 320, and the microcode control bits, may expand to support any desired number of selectable data elements.

The data state section 304 includes the normalization and shifting logic 324 that feeds the A and B accumulator registers. The normalization and shift logic 324 implements bit shifting of accumulator results to the left or to the right according to the value written into shift register. The normalization and shift logic 324 also implements normalization processing of the accumulator results (e.g., left shifting to remove redundant sign bits).

In other implementations, the normalization and shift logic 324 may be implemented in phase 4, the accumulate phase, along with saturation processing. However, saturation, normalization, and shifting operations tend to be time consuming operations. Therefore, dividing these processing steps into different pipeline phases reduces the time needed in any particular pipeline phase to allow the logic to settle and produce the results. These operations may therefore be distributed between different pipeline phases, so that no single pipeline phase has to incur the logic settling delay for all of the operations. Specifically, implementing the normalization and shift logic 324 in phase 1 allows the pipeline clock to run faster and increase the throughput of the pipeline.

The address state section 306 implements direct and indirect addressing modes. In implementation shown in FIG. 3, direct and indirect addressing modes are present for both the Z-RAM 204 and C-RAM. 206 for a Zi register and a Ci register, respectively. In other implementations, multiple index registers (e.g., Z1 and Z2 index registers, and C1 and C2 index registers) may be established and pipelined for each memory. The microcode instruction provides addressing mode control bits on the microcode input 326. The address instruction decode logic 328 determines which addressing mode is selected and responsively outputs multiplexer control signals 330 to implement the addressing mode.

The address offset and segmentation logic 332 may implement special memory addressing modes and are optional features of the architecture 100. In one implementation, the address offset and segmentation logic 332 add an offset (e.g., stored in a register or maintained in a counter) to the address in a manner transparent to the processor. The offset and segmentation logic 332 may thereby turn an absolute address into an indirect address. As a result, the processor 200 gains the efficiency of writing to an absolute address while the hardware automatically adjusts the address with an offset. In addition, the address offset and segmentation logic 332 may include a comparator that compares the current address against a segmentation register to ascertain whether the offset logic and adder should be used to modify the address with the offset. When the address is outside of the segment, the offset logic and adder do not influence the address value. Instead, the address may increment by one. Alternatively or additionally, the architecture 100 may add additional memory index registers in which pre-computed memory offsets are stored for convenient access.

Figure 4:
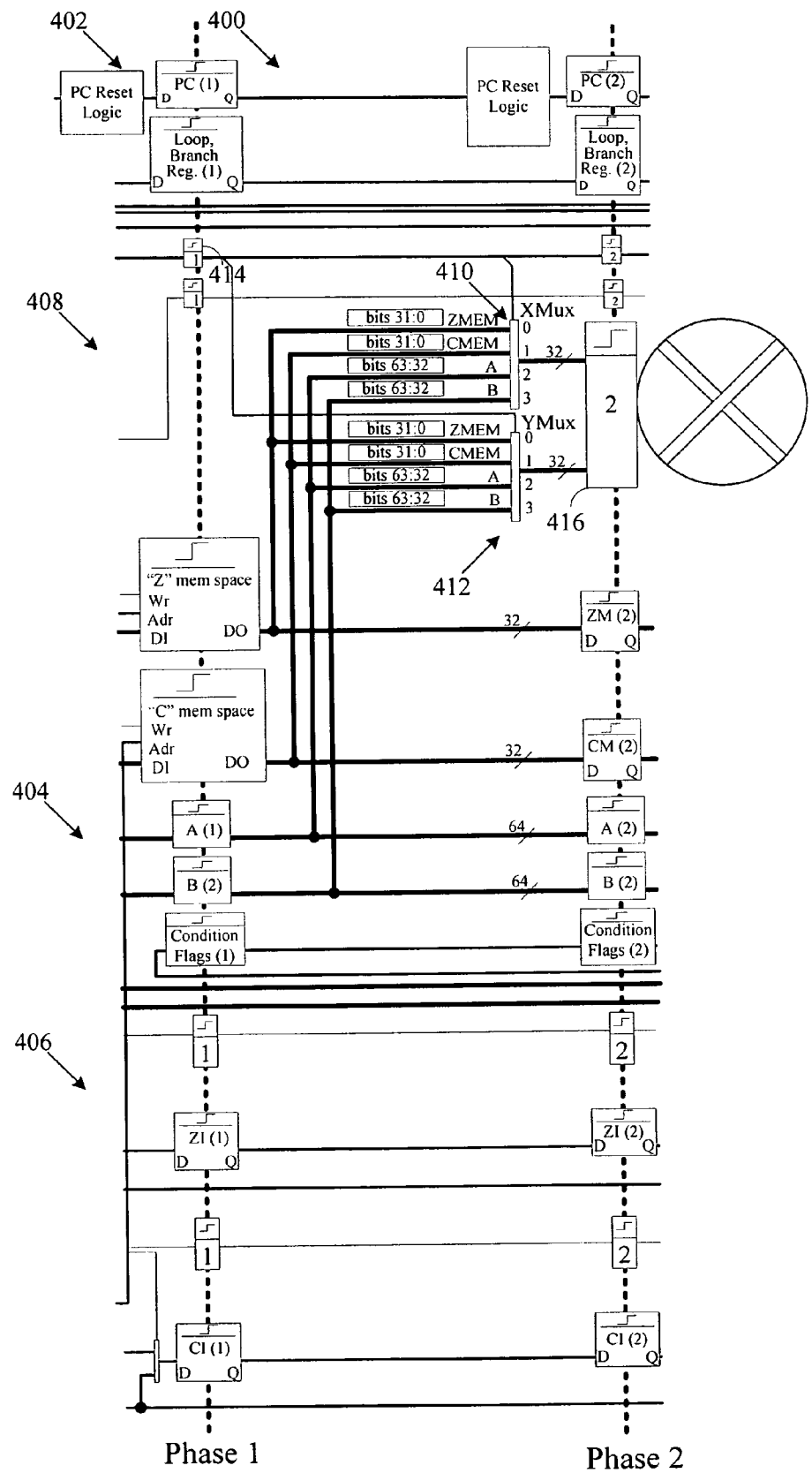

FIG. 4 shows the second phase 400 ("phase 2") of the architecture 100. The dashed line labeled 'Phase 1' passes through the memory elements at the end of phase 1 that store the results of the phase 1 logic. The dashed line labeled 'Phase 2' passes through the memory elements at the end of phase 2 that store the results of the phase 2 logic. Some of the data (e.g., the A accumulator value, B accumulator value, and the condition flag bits) from phase 1 flows between registers (e.g., the A, B, and condition flag registers) to phase 2. In addition, the phase 2 logic determines values for the multiply operation performed in phase 3 and that are stored in the registers through which the 'Phase 2' dashed line passes. Phase 2 includes a portion of the machine state pipeline 104, including a program counter state section 402, a data state section 404 and an address state section 406. Phase 2 also includes a portion of the instruction data pipeline 102, including the data access pipeline stage 408.

In the data access pipeline stage 408, the X multiplexer 410 and Y multiplexer 412 provide a selection of data inputs to the logic in the next phase (phase 3). The microcode instruction provides bits that control the selection. The control bits are pipelined to phase 3 using pipelined microcode registers (e.g., the register 414). The data inputs shown in FIG. 4 include the A accumulator, B accumulator, Z-RAM data, and C-RAM data.

In other implementations, additional, fewer, or different data inputs may be provided on either or both of the X multiplexer 410 or Y multiplexer 412. For example, the data inputs may include constants such as '1', '−1', '2', '0.5', '0.25', '0', '16', or other constants. The data inputs may further include additional accumulator inputs, inputs from the host registers, portions of the accumulators (e.g., the fractional part or exponent of a number), or other data inputs. The data inputs available on the X multiplexer may be different than the data inputs available on the Y multiplexer.

Figure 5:
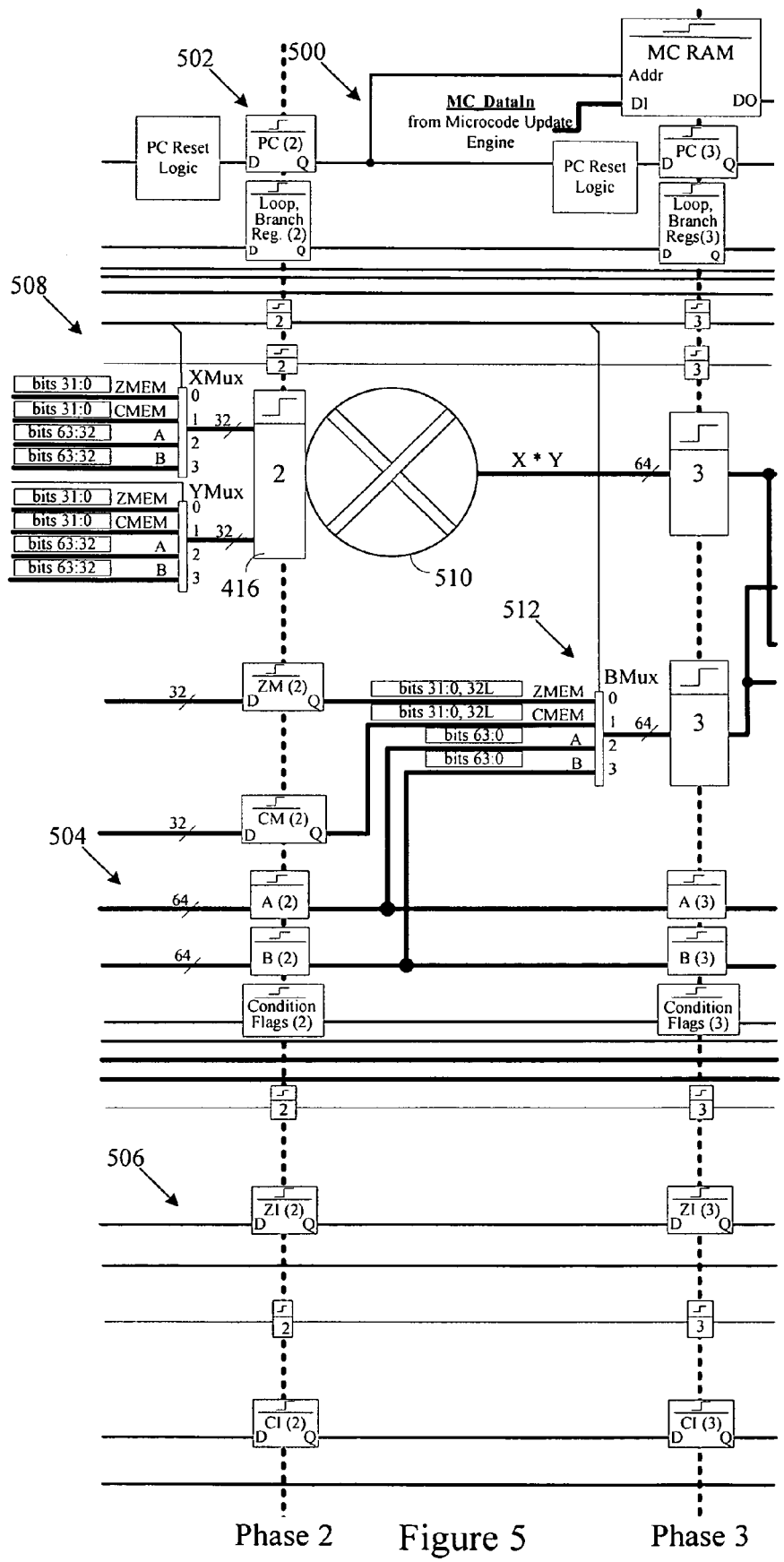

FIG. 5 shows an example of the third phase 500 ("phase 3") of the architecture 100. The dashed lines pass through the memory elements that store the results of the phase 2, and phase 3 logic. Some of the data from phase 2 flows between registers to phase 3. In addition, the phase 3 logic generates other data (e.g., the product the data values input to the multiply phase) that the data pipeline stage stores in the registers at the end of phase 3. Phase 3 includes a portion of the machine state pipeline 104, including a program counter state section 502, a data state section 504 and an address state section 506. Phase 3 also includes a portion of the instruction data pipeline 102, including a multiply pipeline stage 508.

A multiplier 510 forms the product of two data inputs previously selected in phase 2, illustrated in FIG. 4. The multiplier 510 may be a fixed point multiplier, two's complement multiplier, floating point multiplier, or other multiplier. Specifically, the outputs of the X multiplexer 410 and Y multiplexer 412, clocked into the registers 416 at the end of phase 2, provide the data inputs to the multiplier 510. While FIG. 5 shows two 32 bit data inputs multiplied to form a 64 bit output, the data inputs and outputs may be of different bit sizes in other implementations.

The B multiplexer 512 sets up one input for the following accumulate pipeline stage. The microcode instruction includes control bits which determine which B multiplexer input is selected. In FIG. 5, the B multiplexer 512 inputs include the A accumulator, the B accumulator, the data retrieved from Z-RAM 204 and the data retrieved from C-RAM 206.

In other implementations, the B multiplexer 512 accepts additional, fewer, or different data inputs. For example, the B multiplexer 512 may accept constants such as '1', '−1', '0.5', '0', or other constants. The data inputs may further include additional accumulator inputs, inputs from the host registers, portions of the accumulators (e.g., the fractional part or exponent of a number), portions of the program counter state (e.g., the program counter or program counter return value), or other data inputs.

Figure 6:
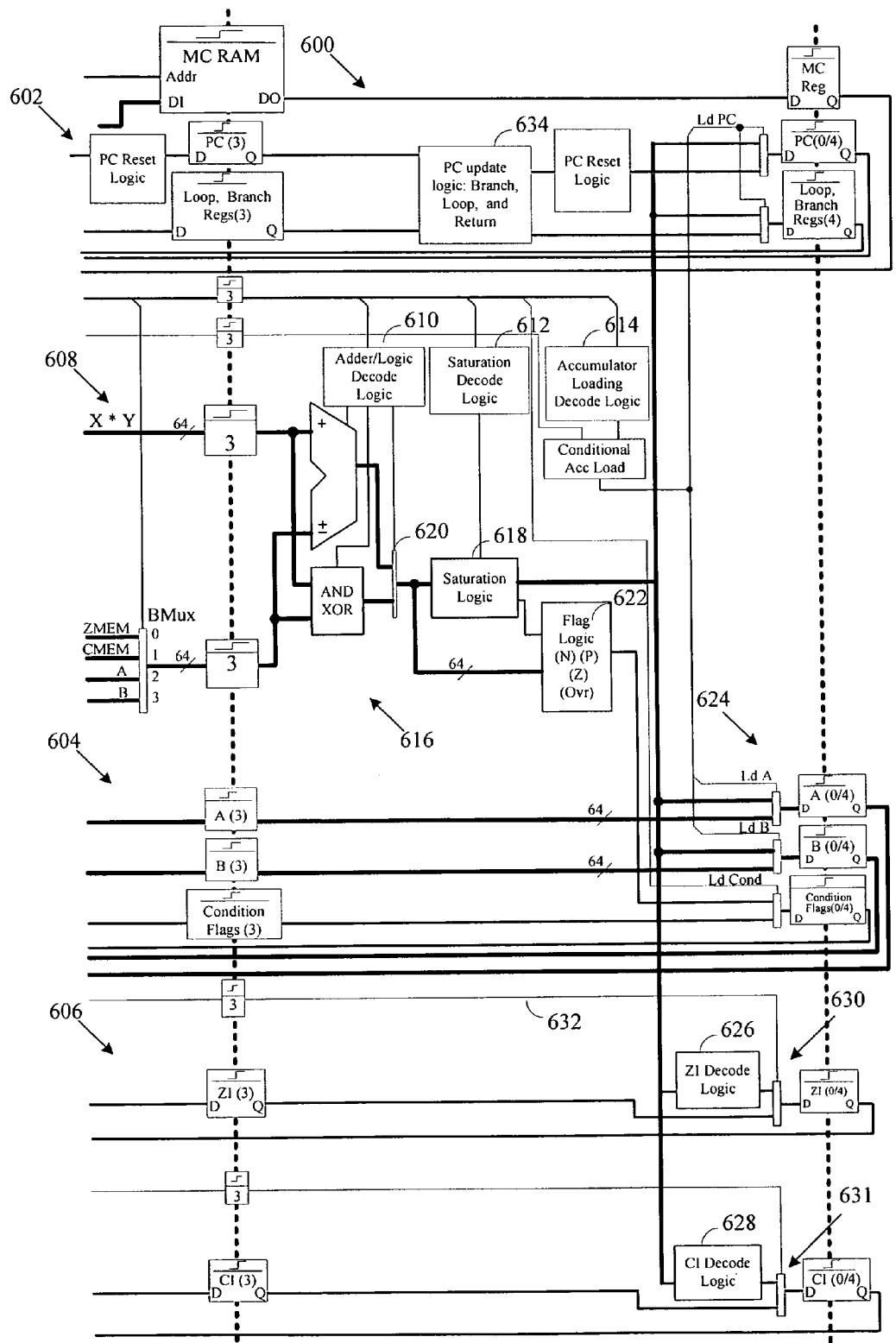

FIG. 6 shows the fourth phase 600 ("phase 4") of the architecture 100. The dashed lines pass through clocked storage elements (e.g., registers, DRAM, SRAM, or other memory) that store the results of the phase 3 logic at the end of that phase, and the phase 4 logic at the end of that phase. Some of the data from phase 3 flows between registers to phase 4. In addition, the phase 4 also generates new data that may be stored in the registers at the end of phase 4. Phase 4 includes a portion of the machine state pipeline 104, including a program counter state section 602, a data state section 604 and an address state section 606. Phase 4 also includes a portion of the instruction data pipeline 102, including the accumulate pipeline stage 608.

The accumulate pipeline stage 608 includes adder/logic decode logic 610, saturation decode logic 612, and accumulator loading decode logic 614. The adder in the accumulate pipeline stage 608 may be a fixed point adder, two's complement adder, floating point adder, or other adder. The adder/logic decode logic 610 decodes microcode bits that specify the operation to perform in the accumulate pipeline stage 608. The adder/logic decode logic 610 provides control outputs to the accumulate circuitry 616. The accumulate logic 616 may include an adder, Boolean logic circuitry (e.g., AND or XOR logic), or other circuitry. In response to the control outputs, the accumulate pipeline stage 608 may add multiple data inputs, or perform logic operations on those inputs as specified by the control outputs. To that end, the microcode bits and the control outputs may specify an Add operation, a Subtract operation, and AND operation, or an XOR operation, as examples.

The microcode bits may further select from between additional inputs (beyond those provided by the B multiplexer 512). For example, an additional multiplexer may be added to the other input of the adder, with additional microcode bits, intermediate results, and/or decoding logic to produce a control signal that chooses the input value to pass through the additional multiplexer. In one implementation, the additional multiplexer may accept a conditional subtract input (e.g., stored in a C accumulator), the output of the multiplier 510, a shifted version of the output of the multiplier (e.g., the output times 16—shifted 4 bits to the left), or other inputs.

The saturation logic 618 implements saturation processing of the accumulator results. The multiplexer 620 selectively provides either the output of the adder or the Boolean logic circuitry to the saturation logic 618. In response to the saturation decode logic 612, the saturation logic 618 limits the output. The saturation logic 618 may limit the output, as examples, to 1, 8, 128, any other magnitude, or perform no saturation. In other words, when saturation is selected, the saturation logic replaces an out-of-bounds value produced by the accumulate pipeline stage with the maximum positive or maximum negative value that is within the specified bounds. A value that the accumulate pipeline stage produces that is already in the specified bounds passes through without change. The saturation logic 618 thereby provides a useful mechanism for limiting the dynamic range of results produced in the accumulate pipeline stage.

The accumulator decode logic 614 responds to microcode instruction bits that specify which accumulator(s) to load. Accordingly, when the accumulate pipeline stage 608 obtains the result, the selected accumulator or accumulators are loaded. To that end, the microcode instruction bits may specify that any combination of one or more of the following should be loaded with the accumulator pipeline stage result: the A accumulator, B accumulator, PC, or any other register.

The accumulator loading is further influenced by the load conditions discussed in the address pipeline stage 300. The flag determination logic 622 determines the conditions associated with the accumulator pipeline stage result (e.g., zero, positive, negative, or overflow). The load conditions may direct the architecture to load the accumulators or to forgo loading the accumulators with a new value, based in part on the flags set or cleared by the flag determination logic 622.

FIG. 6 shows the multiplexers (e.g., the accumulator multiplexers 624) that select the data to load into the accumulators. The data may be the result of the accumulate pipeline stage 608, or the prior accumulator value, as examples. Note that shifting and normalization occurs in phase 1, as noted above in the discussion of phase 3.

FIG. 6 also shows Zi decode logic 626 and Ci decode logic 628. The logic 626, 628 operates on the output of the saturation logic 618. For example, the logic 626, 628 may select specific bits of the 64 bit output to load into the Zi or Ci register. Thus, when the C-RAM memory 216 or Z-RAM memory 214 is smaller than 64 bits of addressable space, the logic 626, 628 may pick the appropriate number of bits (e.g., 10, for a 1024 addressable location Z-RAM) to load. As a result, the Zi and Ci registers may be loaded with the new value provided on the output of the saturation logic 618, or with the prior value of the Ci and Zi registers. The index multiplexers 630 and 631 provide the selection based on the control bits provided on the index selection line 632 by the address ALU instruction decode logic shown in FIG. 3.

The program counter update logic and looping logic 634 coordinates updating of the PC and looping registers. The program counter tracks the current program position for each stage of the pipeline. The looping registers keep track of the looping parameters that determine how many loops to perform, the loop length, and other loop characteristics.

A more detailed view of an implementation of the program counter state sections 302, 402, 502, and 602 is shown in FIGS. 7-10. As noted above, the program counter state sections 302, 402, 502, and 602 implement and maintain the program counters for each independent machine defined by the pipeline and also implement and maintain looping registers for high-speed hardware support of software loops.

Figure 7:
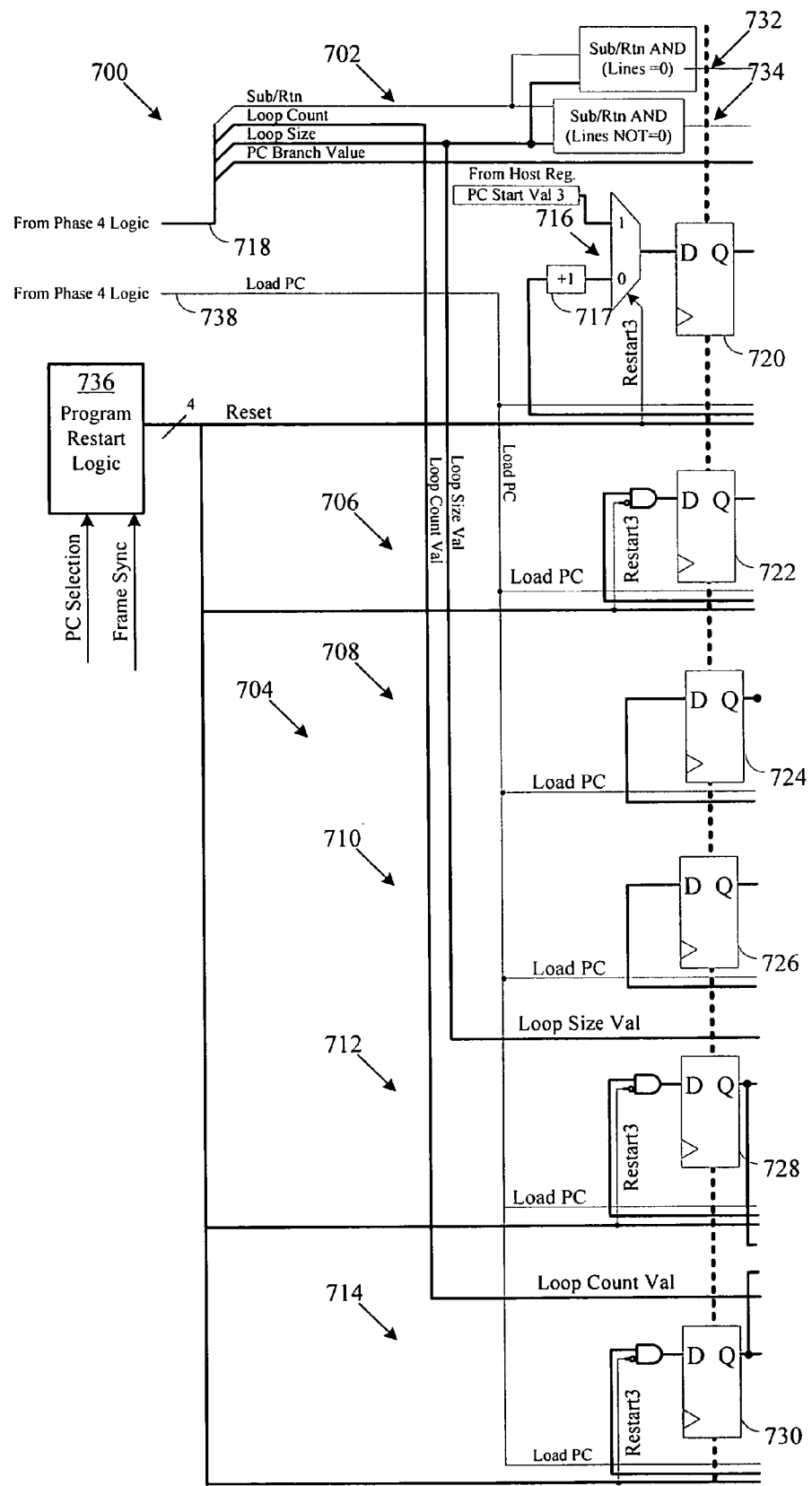

FIG. 7 shows a phase 3 section 700 of the machine state pipeline 104 for handling program counter state. The phase 3 section 700 includes a program counter section 702, and a looping control section 704. The looping control section 704 includes a return section 706, a branch section 708, a loop size section 710, a loop position section 712, and a loop counter section 714. FIG. 7 shows program counter state data from logic in phase 4 of the architecture 100 provided on the program counter state data inputs 718. The program counter state data is used in phase 4 (shown in FIG. 8) to load, as examples, the program counter, loop size, and loop count. In other words, rather than loading an accumulator at the end of phase 4, the architecture 100 may load program counter state data using results obtained by the phase 4 logic that would otherwise have been stored in an accumulator.

Figure 8:
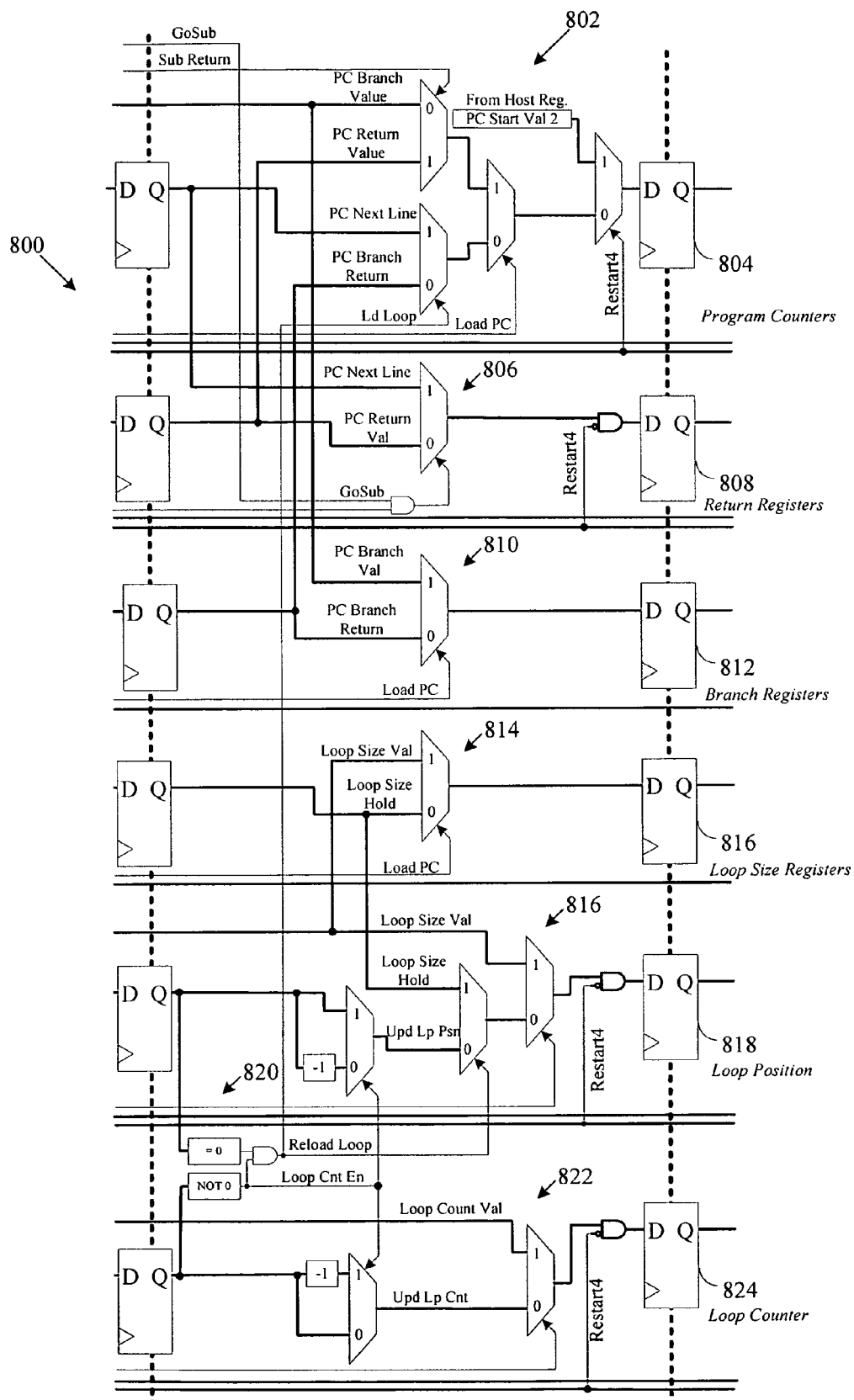

In one implementation, the program counter state data inputs 718 provide a PC branch value (e.g., 12 bits), a number of lines in the loop (e.g., a 9 bit loop size), the number of loops to execute (e.g., a 10 bit loop count), and a return/subroutine flag (e.g., 1 bit). The return/subroutine flag may determine, in conjunction with the loop size, whether to initiate a jump to a new location, a jump to (or a return from) a subroutine, or a jump to the beginning of a loop. Accumulator loading decode logic in phase 4 provides the load PC control signal 738 that influences loading new program counter state data in phase 4, and as shown in FIG. 8. The program restart logic 736 coordinates the restarting of programs in each hardware thread as described in more detail below.

In the program counter section 702, a two input multiplexer 716 selects between values to load into the phase 3 PC register 720. The values include the value of the current PC, plus 1, provided by the adder 717, or a PC start value from the host register. The restart signal is provided by a frame synchronization signal (e.g., a signal that specifies the arrival of a new sample of data), by the currently executing program, by a restart value written to a host register, or by another mechanism.

The return registers (e.g., the phase 3 return register 722) in the return register section 706 track where the program should return to when the subroutine is complete. The branch registers (e.g., the phase 3 branch register 724) provided in the branch register section 708 track where the program is jumping to, or looping back to. The loop size registers (e.g., the phase 3 loop size register 726) provided in the loop size register section 710 track the size of the loop in terms of the number of instructions. The loop position registers (e.g., the phase 3 loop position register 728) in the loop position section 712 track the current position in the loop (e.g., when the loop position=0, the current iteration of the loop is completed). The loop counter registers (e.g., the phase 3 loop counter register 730) in the loop counter section 714 track the number of additional loops to be performed (e.g., when the loop counter=0, the last iteration of the loop is completed).

The subroutine detection logic 732 determines when a subroutine is called. The subroutine return logic 734 determines when to return from a subroutine. The subroutine detection logic 732 generates a multiplexer control signal that selects between a PC branch value and a PC return value in phase 4. The subroutine return logic 732 generates a multiplexer control signal that is used in selecting between the next line of the PC or a PC return value.

FIG. 8 shows a phase 4 section 800 of the machine state pipeline 104 for handling program counter state. In phase 4, the architecture 100 loads or updates the program counter and looping variables using program counter state data provided on the program counter state data inputs 718. For example, the PC control multiplexers 802 determine whether to update the phase 4 PC register 804 with: 1) the next line in the program, i.e., PC +1; 2) a PC branch value; 3) a PC return value; 4) a PC branch return value; or 5) a new PC start value.

The return register control multiplexer 806 determines whether to update the phase 4 return register 808 with: 1) the next line in the program, i.e., PC +1; or 2) a PC return value. The branch register control multiplexer 810 determines whether to update the phase 4 branch register 812 with: 1) the PC branch value; or 2) the PC branch return value. The loop size register control multiplexer 814 determines whether to update the phase 4 loop size register 816 with: 1) the new loop size value (e.g., for when a new loop is starting); or 2) the current loop size value that is held until the loops are finished and that is reloaded for each loop iteration.

In addition, the loop position control multiplexers 816 determine whether to update the phase 4 loop position register 818 with: 1) the new loop position value (e.g., set to the loop size when a new loop is begun); 2) a current loop size value (e.g., when the current iteration of a loop is finished and the next iteration of the loop is begun); or 3) an updated loop position value (e.g., the prior loop position −1, decremented as the architecture 100 makes its way through the loop). The loop position logic 820 generates a reload loop control signal based on loop position=0 AND loop counter is not equal to 0. Thus, when there are additional loops left to process, and the end of the current loop is reached (e.g., loop position=0), then the loop position is reloaded with the loop size. Furthermore, the loop position logic 820 generates a loop counter enable signal, for example when loop counter is not equal to 0 (e.g., when there are additional loops to process).

The loop counter control multiplexer 822 determines whether to update the phase 4 loop counter 824 with: 1) the loop count value; or 2) a decremented loop count; or 3) a non-decremented loop count. For example, when there are additional loops to process (e.g., loop count is not equal to 0), then the loop count is decremented and loaded into the phase 4 loop count register 824.

Figure 9:
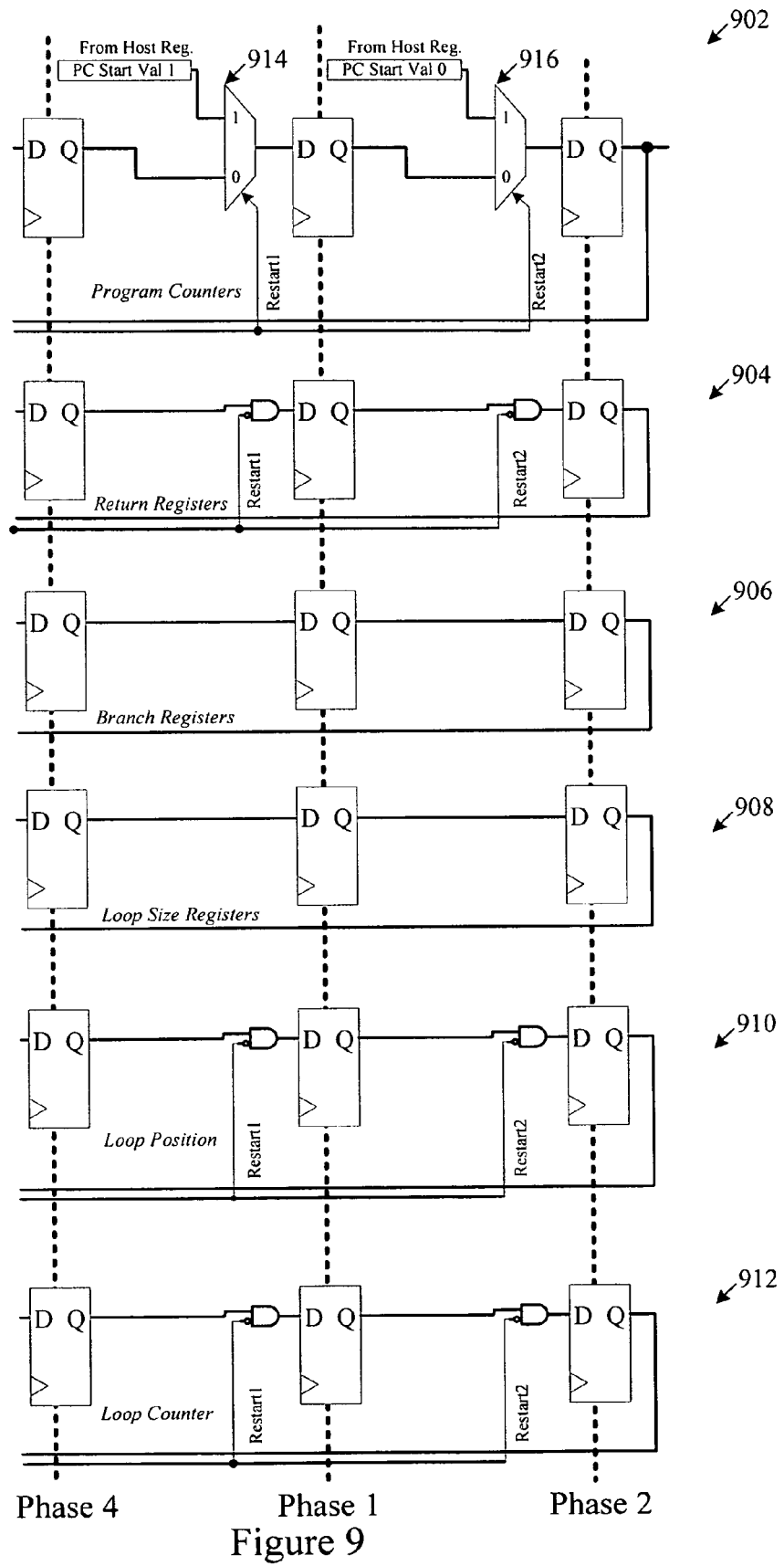

FIG. 9 shows phase 1 and phase 2 sections 900 of the machine state pipeline 104 for handling program counter state. The dashed lines pass through the memory elements that propagate the PC and looping data between registers 902, 904, 906, 908, 910, and 912 between phase 1 and phase 2. FIG. 9 also shows the PC loading multiplexers 914 and 916 that selectively load the PC in phase 1 or phase 2 with a new PC start value.

Figure 10:
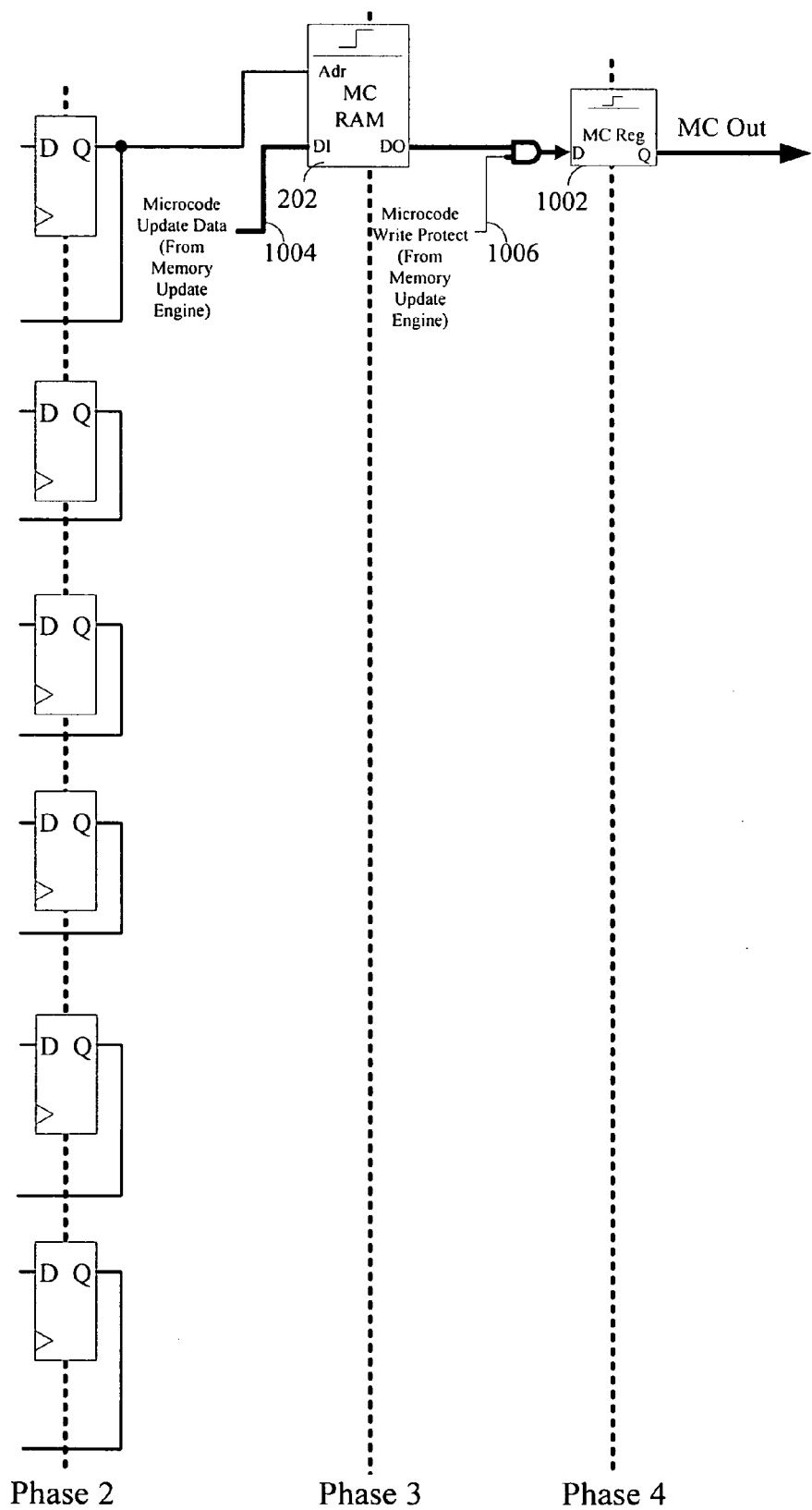

FIG. 10 shows additional logic in the phase 3 and phase 4 sections of the machine state pipeline 104. FIG. 10 illustrates that PC address is applied to the microcode memory 202 in phase 3 to obtain the next microcode instruction for phase 4. The next microcode instruction is clocked into the microcode register 1002 in phase 4. The microcode bits are thereby available to control the execution of the pipelined architecture 100 through subsequent phases 1 to 4.

The machine state pipeline 104 includes program restart logic 736 to determine when to reload the program counter for each pipeline phase (and thus for each independent hardware thread). The program restart logic 736 may implement independent reset control over each program counter register and selected loop registers in each pipeline phase. The PC selection input may specify which program counters to reload. Thus, as shown in FIG. 7, the program restart logic 736 provides four independent restart signals Restart1, Restart2, Restart3, and Restart4. Each restart signal reloads the particular PC register, and clears the return register, loop position register, and loop counter register for a particular pipeline phase. For example, Restart3 reloads the PC and clears the registers for the third independent hardware thread running in phase 3 of the pipeline. The program restart logic 736 may assert all of the restart signals at the same time. Restarting each of the program counter registers at the same time provides for four synchronized independent hardware threads to execute on the architecture 100.

However, rather than reloading all of the program counter registers at once, the program restart logic 736 may individually determine which of the program counter registers to load in response to a load condition (e.g., a hardware reset, a load request from the host, or a load request from an executing program). The program restart logic 736, for example, may assert the restart signals to provide round-robin restart of the 'n' program counter registers in the 'n' pipeline stages. In that case, the architecture 100 provides execution of a program that is, effectively, 'n' times as long as a program under the circumstance where all the program counter registers are restarted together. When processing audio samples, for example, each pipeline stage may execute an audio processing program which operates on the output of the program executing in the prior pipeline stage. The architecture 100 allows the audio processing program to be effectively 'n' times longer than it otherwise could be.

Figure 11:
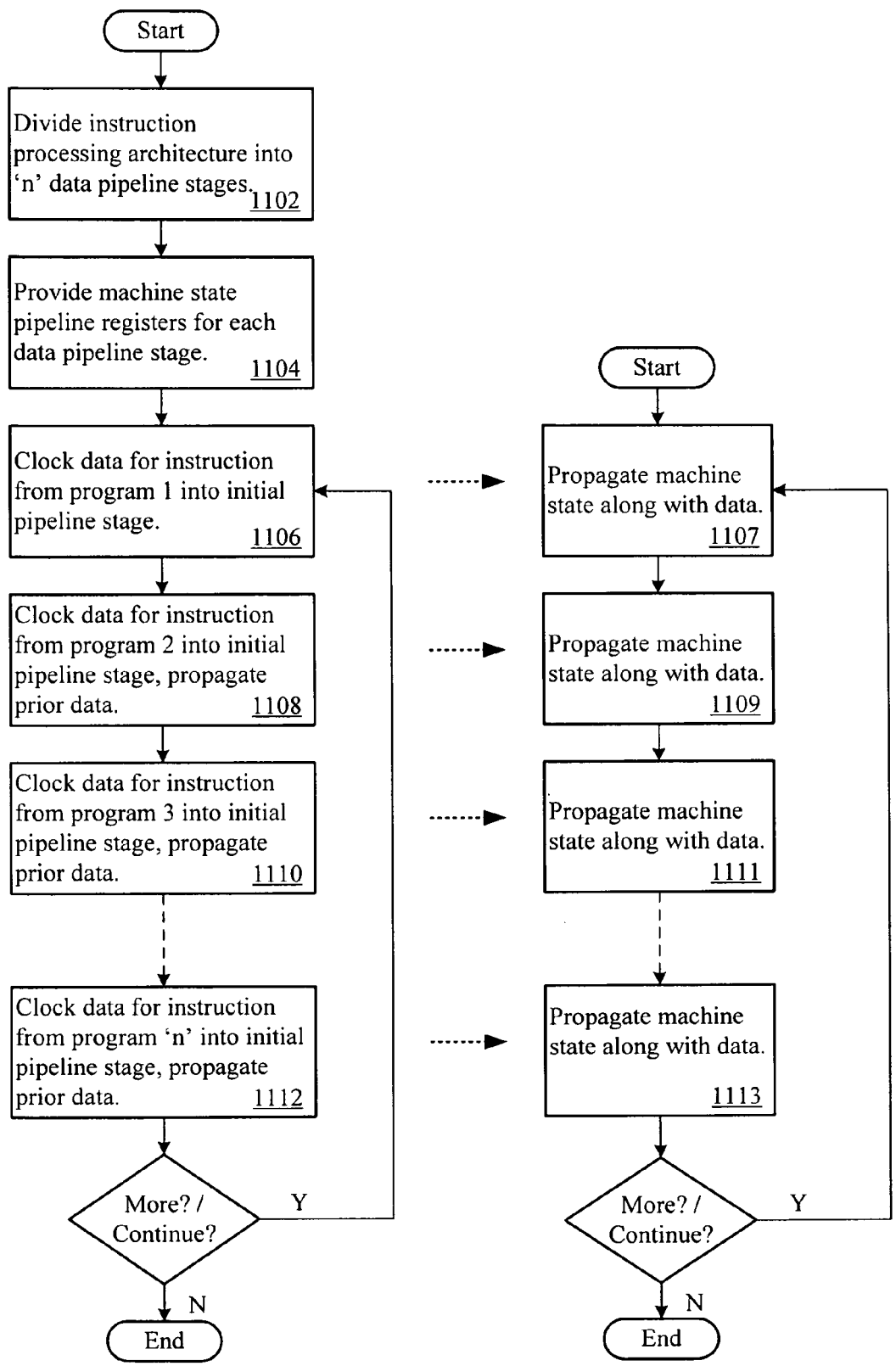

FIG. 11 summarizes the acts taken to implement and execute the pipelined architecture 100. An instruction processing architecture is divided into 'n' data pipeline stages (Act 1102). For example, the data pipeline stages may include an address generation pipeline stage, a data access pipeline stage, a multiply pipeline stage, and an accumulate pipeline stage, although additional, fewer, or different data pipeline stages may be implemented. The 'n' data pipeline stages provide independent hardware threads that execute 'n' programs. Each clock brings an instruction from the next program into the data pipeline. The data pipeline operates in a round-robin manner, returning to obtain the next instruction from the first program after the instruction from program 'n' (i.e., the last program) has begun execution.

To support the independent hardware threads, a pipelined machine state is provided (Act 1104). The pipelined machine state may propagate through registers down the machine state pipeline. Each data pipeline stage therefore has the proper context provided for executing each of the 'n' programs, as the pipeline stage changes to a new program (of the 'n' programs) each clock. The pipelined machine state may include a Program Counter (PC) state 118, Address state 120, and Data state 122. The pipelined machine state may include additional, different, or fewer states, such as a Microcode state 124 and an Intermediate Result state 126.

The architecture 100 clocks in data for an instruction from program 1 into the pipeline (Act 1106). The clock also propagates machine state along the machine state pipeline 104 (Act 1107). Accordingly, the pipeline stage that processes the instruction has the proper execution context (e.g., including PC, accumulator values, and address information) for processing the data for the instruction in that data pipeline stage.

Each clock introduces data for a new instruction from one of the 'n' programs into the instruction data pipeline 102. The clocks also propagate the data for the prior instruction down the instruction data pipeline 102. (Acts 1108, 1110, and 1112). At the same time, the machine state flows down the machine state pipeline 104 to provide the proper context for processing the data for each instruction (Acts 1109, 1111, and 1113). The architecture 100 processes new instructions and propagates machine state as long as there are instructions to execute.

The architecture 100 includes microcode updating logic. The microcode updating logic loads the contents of the microcode memory 202 to initially setup, replace, correct, or extend the microcode instructions. FIG. 10 shows that the microcode updating logic provides microcode update data on the data lines 1004. While the microcode is updated, the microcode update logic may also provide a write protect signal on the write protect line 1006 to prevent undesired output from the microcode memory 202 from being written into the microcode register 1002 while updates occur.

Figure 12:
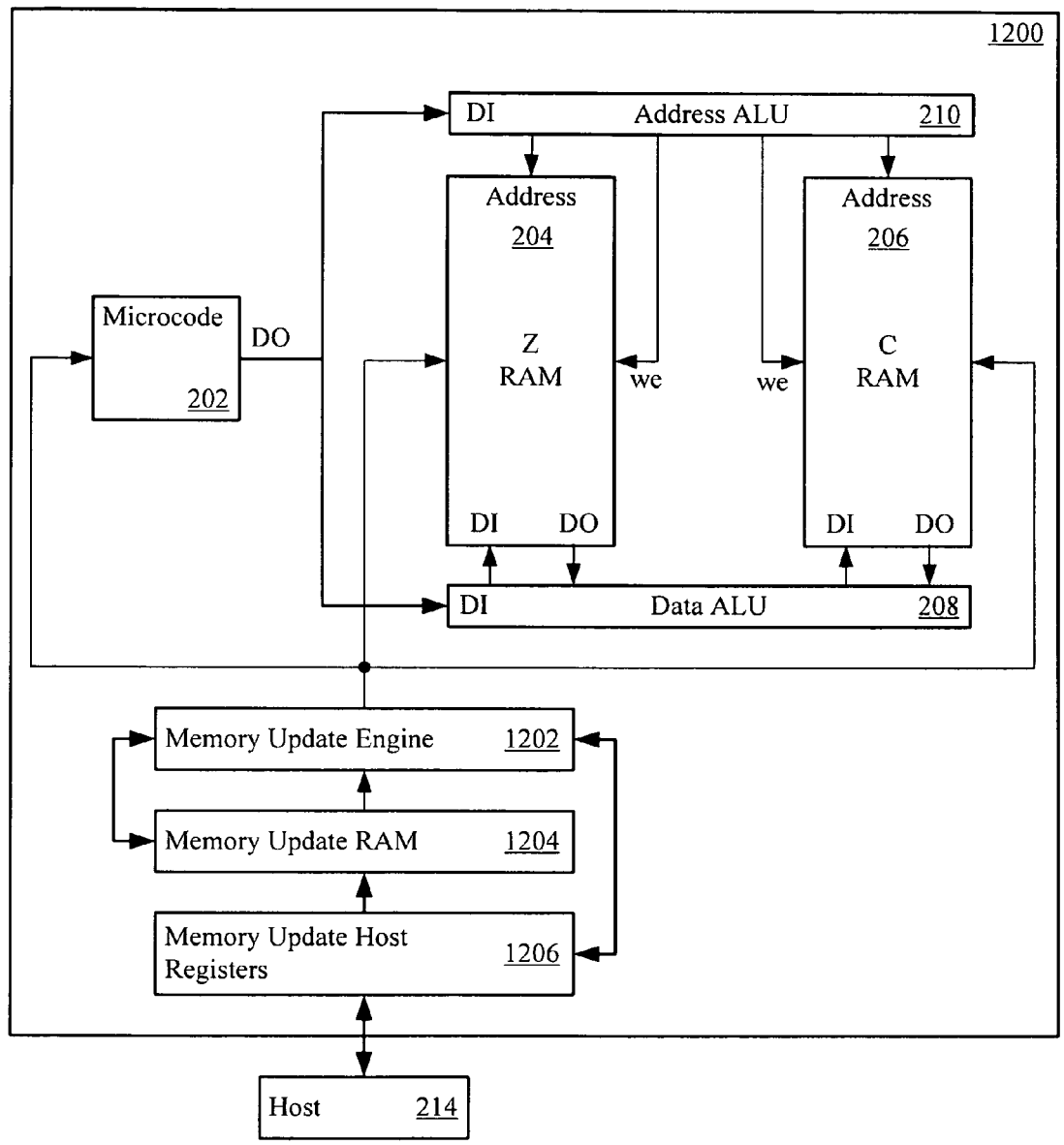
FIGS. 12-17 show a memory update engine. The components in the figures are not necessarily to scale, emphasis instead being placed upon illustrating the principles of the disclosure. Moreover, in the figures, like referenced numerals designate corresponding parts throughout the different views.

FIG. 12 shows an implementation of a digital signal processor 1200 that incorporates a memory update engine 1202. The memory update engine 1202 may be used in conjunction with the instruction processing architecture 100 described above. The memory update engine 1202 obtains update parameters (e.g., addresses, data and instructions) for the microcode memory 202, Z-RAM 204, or C-RAM 206 from a memory update RAM 1204. The host 214 may provide the update parameters to the memory update RAM 1204 through the memory update host registers 1206. The host 214 also writes to the memory update host registers 1206 to provide control bits to the memory update engine 1202, and reads from the memory update host registers 1206 to obtain status information from the memory update engine 1202. Depending on the implementation, the memory update engine 1202 may perform updates on additional, fewer, or different memories.

The memory update engine 1202 provides dynamic updating of microcode instructions or of data in the Z-RAM 204 or C-RAM 206 without requiring the DSP 1200 to shutdown or stop processing for an extended number of clock cycles. As a result, the DSP 1200 effectively continues processing data without interruptions. Thus, for example, a DSP 1200 that processes sound samples may seamlessly change during live performances. As examples, the host 214 may change filter coefficients, special effects parameters, microcode instructions for processing sound samples, or any other parameters on-the-fly.

Figure 13:
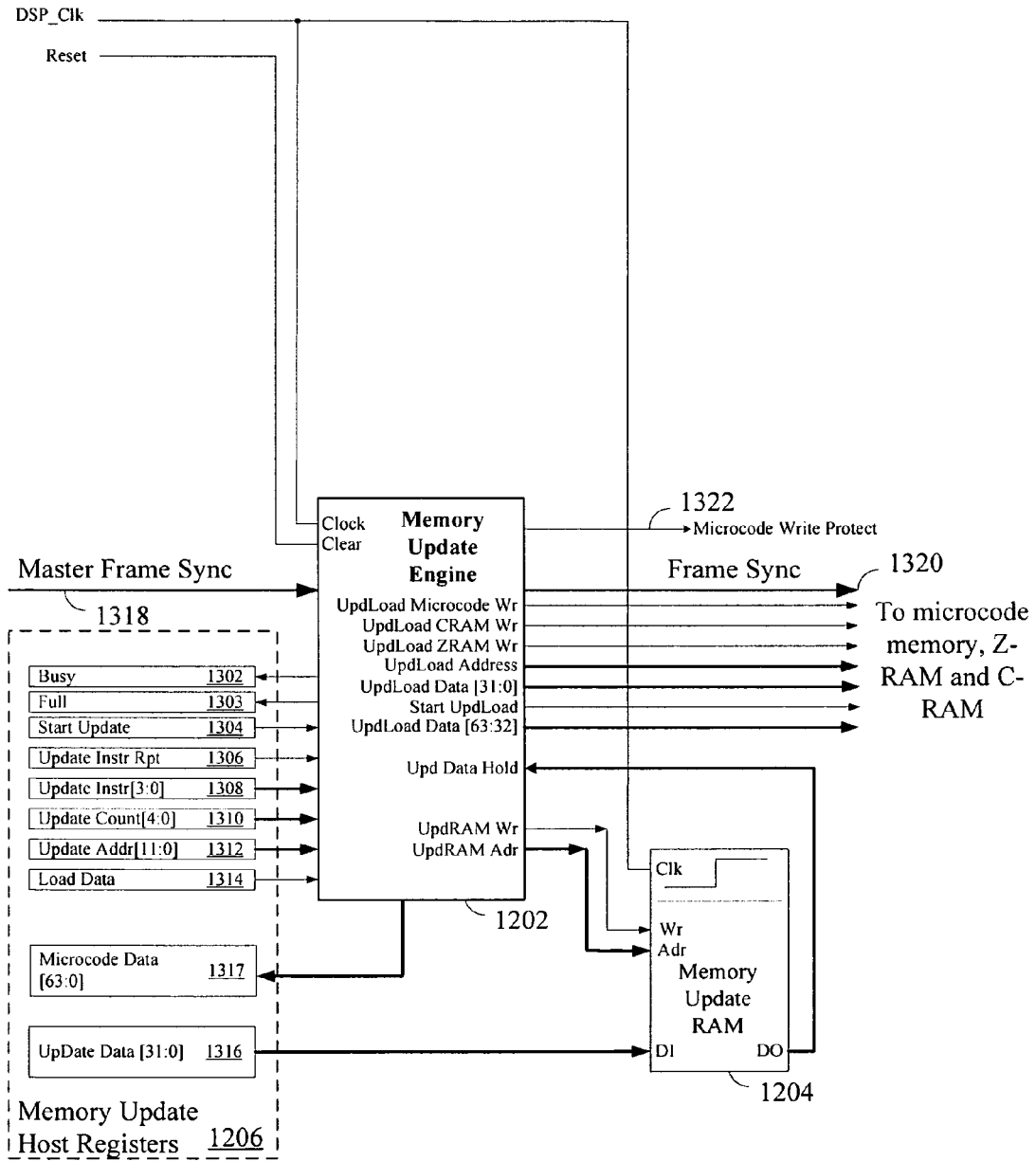

FIG. 13 shows the memory update host registers 1206 in more detail. The memory update host registers 1206 provide operational parameters and control instructions to the memory update engine 1202 and also provide status bits for the host 214. The memory update host registers 1206 include a busy register 1302, a full register 1303, a start update register 1304, and an update instruction repeat register 1306. In addition, the memory update host registers 1206 include an update instruction register 1308, an update count register 1310, an update address register 1312, and a load data register 1314. An update data register 1316 stores an update parameter provided by the host 214, while a microcode data register 1317 stores a microcode instruction. The memory update engine 1202 reads the microcode instruction from the microcode memory 202 and stores it in the microcode data register 1317 in response to a request from the host 214. Each register 1302-1317 may be implemented as one or more bits in a data unit (e.g., an 8-bit memory location) in the host memory space, or any other memory space. As described in more detail below, the start update register 1304 and the update instruction register 1308 provide different mechanisms for initiating execution of the memory update engine 1202. Other mechanisms may be used, depending on the implementation.

Table 3, below, shows one example of the distribution of the registers 1302-1317 in the host registers 212. In particular, Table 3 shows that the update data register 1316 is implemented as four 8-bit memory locations (32 bits labeled UpdData0-UpdData31), and that the update address register 1312 spans two 8-bit memory locations (12 bits labeled UpdAddr0-UpdAddr11). The update data register 1316 may store instructions that update the microcode memory 202, data that updates data in the Z-RAM 204 or C-RAM 206, memory addresses to update, or any other type of update parameter. In addition, Table 3 shows that several of the registers define status bits. For example, bit 7 of the update address register 1312 provides a ready/busy status bit. Any other distribution or organization of the registers may be established, and additional, fewer, or different control or data registers may be employed.

TABLE 3

Memory Load and Update Host Registers

| Address | | Bit | | | | | | | |
|---|---|---|---|---|---|---|---|---|---|
| Hex | Dec | 7 | 6 | 5 | 4 | 3 | 2 | 1 | 0 |
| 0C | 12 | | | | | | | | |
| 0D | 13 | UpdStat | UpdFull | | | UpdAddr11 | UpdAddr10 | UpdAddr9 | UpdAddr8 |
| 0E | 14 | UpdAddr7 | UpdAddr6 | UpdAddr5 | UpdAddr4 | UpdAddr3 | UpdAddr2 | UpdAddr1 | UpdAddr0 |
| 0F | 15 | | | | UpdCnt4 | UpdCnt3 | UpdCnt2 | UpdCnt1 | UpdCnt0 |
| 10 | 16 | UpdData31 | UpdData30 | UpdData29 | UpdData28 | UpdData27 | UpdData26 | UpdData25 | UpdData24 |
| 11 | 17 | UpdData23 | UpdData22 | UpdData21 | UpdData20 | UpdData19 | UpdData18 | UpdData17 | UpdData16 |
| 12 | 18 | UpdData15 | UpdData14 | UpdData13 | UpdData12 | UpdData11 | UpdData10 | UpdData9 | UpdData8 |
| 13 | 19 | UpdData7 | UpdData6 | UpdData5 | UpdData4 | UpdData3 | UpdData2 | UpdData1 | UpdData0 |
| 14 | 20 | | | | | | | | UpdStat/Ld |
| 15 | 21 | | | | UpdInstrRpt | UpdInstr3 | UpdInstr2 | UpdInstr1 | UpdInstr0 |

Table 4 provides an explanation of the address, data, and status bits shown in Table 3. A status bit, 'UpdStat', indicates whether the memory update engine 1202 is 'busy' (i.e., performing an update) or 'ready' (i.e., ready to perform an update). A full bit, 'UpdFull', indicates whether the memory update RAM is full. The host 214 may check the full bit before writing another data unit to the memory update RAM 1204. The status bit, full bit or both may be provided in multiple locations in the host registers for convenient access. Additionally, the status bit and full bit may be combined into a single status bit with a temporal distinction in role. For example, before the host 214 initiates the memory update, the role of the combined status bit may be to reflect whether the memory update RAM 1204 is full. After the host 214 initiates the memory update, the role of the combined status bit may be to reflect whether the memory update engine 1202 is busy performing the memory update. Any particular implementation may define additional, fewer, or different status bits.

TABLE 4

Memory Update Address, Data, and Status Bits

| Bit Field | Explanation |
| --- | --- |
| UpdStat (Update Status) | Status provided by the update engine, for example, 0 = ready, 1 = busy |
| UpdAddr[11:0] (Update Address) | The address where updating will start. The address may be relative to the memory space being updated (e.g., microcode, Z-RAM or C-RAM). UpdInstr (Table 5) determines the memory space to update. |
| UpdFull (Update Full) | Indicates whether the memory update RAM is full, for example, 0 = not full, 1 = full. |
| UpdCnt[4:0] (Update Count) | Holds the count of units the host will update, minus 1. The units may be continuous or may be in any arbitrary order. |
| UpdData[31:0] (Update Data) | A 32 bit data unit that will update a unit in one of the DSP's memory spaces (e.g., microcode, Z-RAM, or C-RAM). Two units may be written per 64 bit microcode line, with the least significant word written first. |
| UpdStat/Ld (Update Load) | The host writes a '1' to this bit to instruct the DSP to load the data in UpdData[31:0] into the memory update RAM 1204. |

To setup the parameters that will update one of the memories, the host 214 writes parameters to the update data register 1316, then sets the load data register 1314 to '1'. The memory update engine 1202 responds by writing the parameter in the update data register 1316 into the memory update RAM 1204 and resetting the load data register 1314 to '0'. The memory update engine 1202 increments an internal memory counter that specifies the next location in the memory update RAM 1204 to write to. The memory counter may roll over to zero when it reaches the end of the memory update RAM 1204. In addition, when the memory update engine 1202 has written to the last location in the memory update RAM 1204, the memory update engine 1202 may set a full flag in the full register 1303. The host 214 may thereby determine when the memory update RAM 1204 has stored as many update values as it can hold.

The host 214 need not fill the entire memory update RAM 1204 with update values. Instead, the host 214 may store one, two, or any other number of update values in the memory update RAM 1204, subject to the capacity of the memory update RAM 1204. The host 214 writes to the update count register 1310 to specify the number of data units for the memory update engine 1202 to update. As examples, the data unit may be a 64-bit microcode instruction or a 32-bit data word in Z-RAM 204 or C-RAM 206. Other memories in the processor may have different organizations that adhere to different data unit sizes (e.g., 8-bits).

In one implementation, the memory update engine 1202 initiates a memory update after the host 214 writes a valid (e.g., non-zero) update instruction to the update instruction register 1308. Prior to the update instruction, the host 214 therefore provides the update data, update address, update instruction repeat data, and update count to the memory update engine 1202. When the master frame synchronization signal arrives, the memory update engine 1202 executes the memory update when a valid update instruction has been provided. When the update finishes, the memory update engine 1202 clears the update instruction register 1308. In other implementations, the memory update engine 1202 may initiate a memory update after the host 214 writes to the start update register 1304. The memory update engine 1202 then clears the start update register 1304 when the update completes. More generally, the host establishes a start update condition to initiate operation of the memory update engine 1202, and the memory update engine 1202 clears the start update condition when the update is complete. A non-zero update instruction and writing a start update bit are two examples of such start update conditions.

Table 5 provides an explanation of the update instruction register bits shown in Table 3. The host 214 writes to the update instruction register 1308 to specify the particular updating operation that the memory update engine 1202 will perform. The update instruction register 1308 also specifies the memory that the memory update engine 1202 will write to.

The memory update engine 1202 may write update data in a non-sequential or sequential address order. For non-sequential addresses, the host 214 may write a sequence of address and data parameter pairs to the memory' update RAM 1204. The addresses specify the locations to write the data. For sequential addresses, the host provides a starting address on the update address register 1312 and the memory update engine 1202 automatically increments by one the last address for each data Unit written.

TABLE 5

Update Instruction

| Bit Field | Value | Explanation |
| --- | --- | --- |
| UpdInstr[1:0] (Memory Specifier) | 0 | No Update |
| | 1 | Update Z-RAM |
| | 2 | Update C-RAM |
| | 3 | Update Microcode Memory |

TABLE 5-continued

Update Instruction

| Bit Field | Value | Explanation |
|---|---|---|
| UpdInstr[2] (Sequential/ Nonsequential Update) | 0 | The memory update engine 1202 reads the memory update RAM 1204 to obtain an address, then reads the next data unit from the memory update RAM to obtain the data to be written to that address. The memory update engine 1202 may write to non sequential addresses. |
| | 1 | The memory update engine 1202 updates addresses by incrementing the address after data is written. The update address is used as the starting address. |
| UpdInstr[3] (Read/ Update) | 0 | Write to memory, as specified by UpdInstr[1:0] |
| | 1 | Read microcode from a location specified by the update address register. The host may load the address to read before setting this bit. The memory update engine writes the data from the microcode memory 202 into the host registers as Microcode Data[63:0] |
| UpdInstrRpt (Instruction Repetition) | 0 | The memory update engine 1202 updates the data once. |
| | 1 | The memory update engine 1202 repeatedly updates the data at a predetermined interval (e.g., each frame synchronization) until this register is set to 0. As an alternative, the memory update host registers 1206 may provide multiple bits for the update instruction repeat register 1306. The update instruction repeat register 1306 may then specify a count value for the number of times to repeat the memory update operation using the data loaded into the memory update RAM 1204. The memory update engine 1202 may load the count into an internal register and decrement the register after each update. When the count reaches zero, the memory update engine 1202 may clear the update instruction repeat register 1206, set a done flag in the memory update host registers 1206, or take another action. |

The host interface, update data register 1316, memory update RAM 1204, microcode memory 202, Z-RAM 204, and/or C-RAM 206 may have different sizes and organizations. Thus, while the update data register 1316 is shown as spanning 32 bits, the update data register may instead be 8 bits wide, 16 bits wide, 64 bits wide, or any other width. Similarly, the memory update RAM 1204 may be organized as 32 words×32 bits per word, 16 words×64 bits per word, or any other organization. Increasing the memory update RAM capacity increases the number of microcode instructions or memory locations that may be updated in one update cycle.

In one implementation, the microcode memory 202 is 64 bits wide while the Z-RAM 204 and C-RAM 206 are 32 bits wide. Accordingly, to update a microcode instruction, the host 214 may write two 32-bit values into the memory update RAM 1204. For example, the two 32-bit values may be written least significant word followed by most significant word. The memory update engine 1202, when updating a microcode instruction, may then read two 32-bit values from the memory update RAM 1204. The memory update engine 1202 holds one 32-bit value internally while retrieving the second 32-bit value in order to obtain the entire 64-bit microcode instruction from the memory update RAM 1204.

In one implementation, the memory update engine 1202 updates the memory specified in the update instruction register 1308 between samples of incoming data. For example, the memory update engine 1202 may initiate the memory update operation upon receipt of a master frame synchronization signal on the master frame synchronization input 1318. The master frame synchronization signal indicates that a new data sample has arrived. When the memory update operation is complete, the memory update engine 1202 may then issue a follow-up frame synchronization signal to other logic in the processor (e.g., the program restart logic 736) on the follow-up frame synchronization output 1320. As noted above with regard to FIG. 7, the program restart logic 736 may use the frame synchronization signal to restart one or more programs that process the next data sample. In other words, the memory update engine 1202 delays program restart until memory updating has finished.

Figure 14:
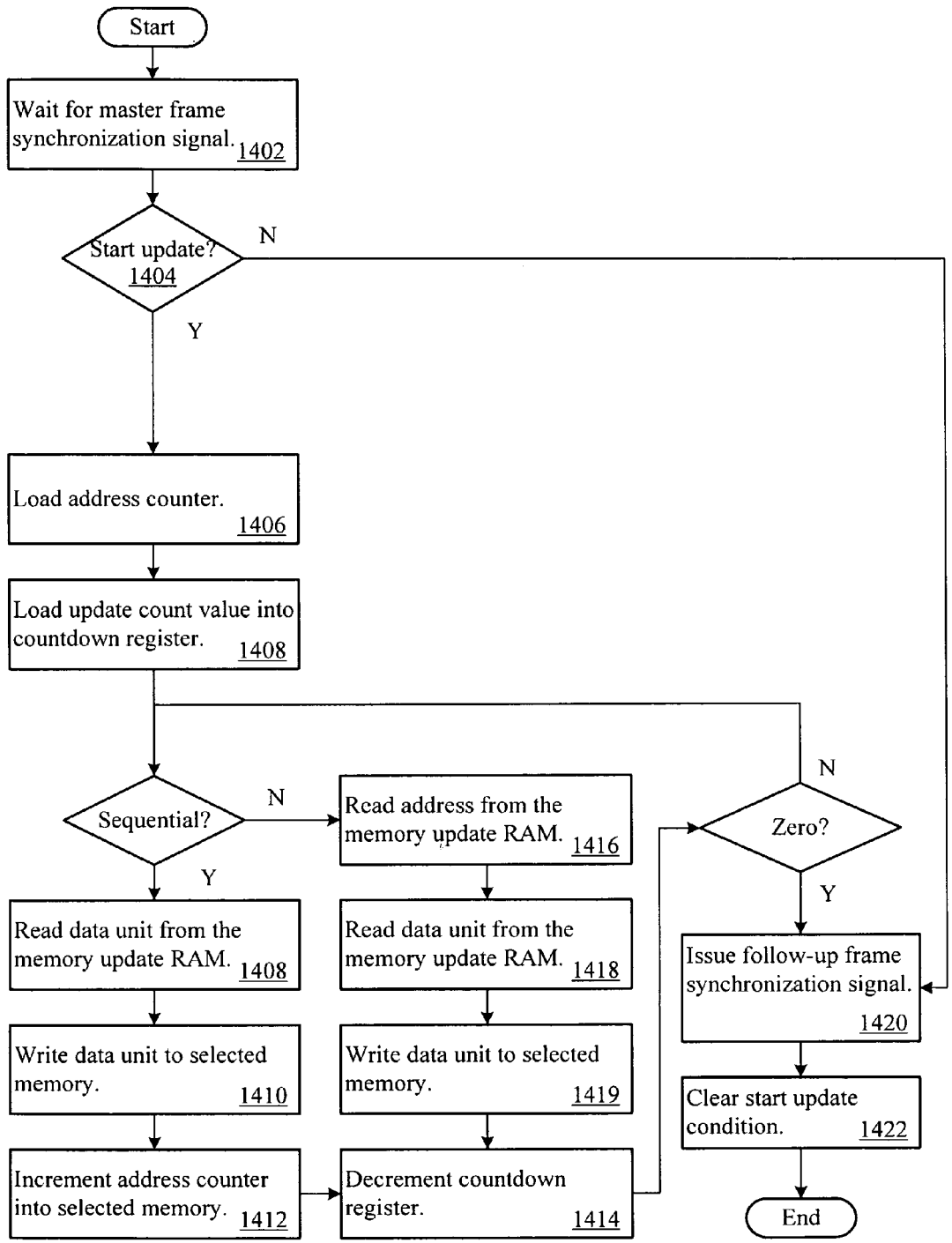

FIG. 14 shows the acts taken by the memory update engine 1202. The memory update engine 1202 may be implemented as a state machine, as a controller operating under program control, or using other logic or circuitry. The memory update engine 1202 waits for the master frame synchronization signal (Act 1402). The memory update engine then checks whether the host 214 has stored a valid (e.g., non-zero) update instruction into the update instruction register 1308 (Act 1404). Alternatively, the memory update engine 1202 may check whether the host 214 has written to the start update register 1304, or the host 214 has established any other start update condition. When no update will be done (e.g., because no valid update instruction has been provided), the memory update engine 1202 issues the follow-up frame synchronization signal (Act 1420).

Otherwise, the memory update engine 1202 loads an internal address counter with the contents of the update address register 1312 (Act 1406). The memory update engine 1202 also places the update count value into a countdown register (Act 1408). The memory update engine 1202 then reads data values from the memory update RAM 1204 and increments the address counter on each read.

For each data unit retrieved from the memory update RAM 1204, the memory update engine writes the data unit to memory specified in the update instruction. For example, for each microcode instruction update, the memory update engine 1202 reads two 32-bit data values from the memory update RAM 1204, and writes the 64-bit microcode instruction to the microcode RAM 202.

When the update instruction specifies sequential addressing, the memory update engine 1202 reads the data unit from the memory update RAM 1204 (Act 1408), writes the data unit to the selected memory (Act 1410), increments the address counter into the selected memory (Act 1412), and decrements the countdown register (Act 1414). The memory update engine 1202 continues to read data units from the memory update RAM 1204 until the countdown register reaches zero.

When the update instruction specifies non-sequential addressing, the memory update engine 1202 reads a first parameter, an address, from the memory update RAM 1204 (Act 1416) followed by a second parameter, a data unit, to write to that address (Act 1418). The memory update engine 1202 writes the data unit to the selected memory (Act 1419). The memory update engine 1202 reads as many data units as the update count value specifies. When the counter is decremented to zero, the update is finished, and the memory update engine 1202 issues the follow-up frame synchronization signal (Act 1420) to restart one or more programs. If it was set to initiate the memory update operation, the memory update engine 1202 also clears the start update condition (e.g., by clearing the update instruction register 1308 or the start update register 1304) (Act 1422).

FIG. 13 shows that the memory update engine 1202 also issues a microcode write protect signal 1322. As shown in FIG. 10, the write protect signal 1322 ensures that the microcode register 1002 is loaded with known data (e.g., all zeros or any other bit pattern representing a NOP instruction) while the memory update engine 1202 is updating memory. Accordingly, the instruction pipeline 100 is protected against making unpredictable changes to previously determined results stored in the memories or accumulators.

Figure 15:
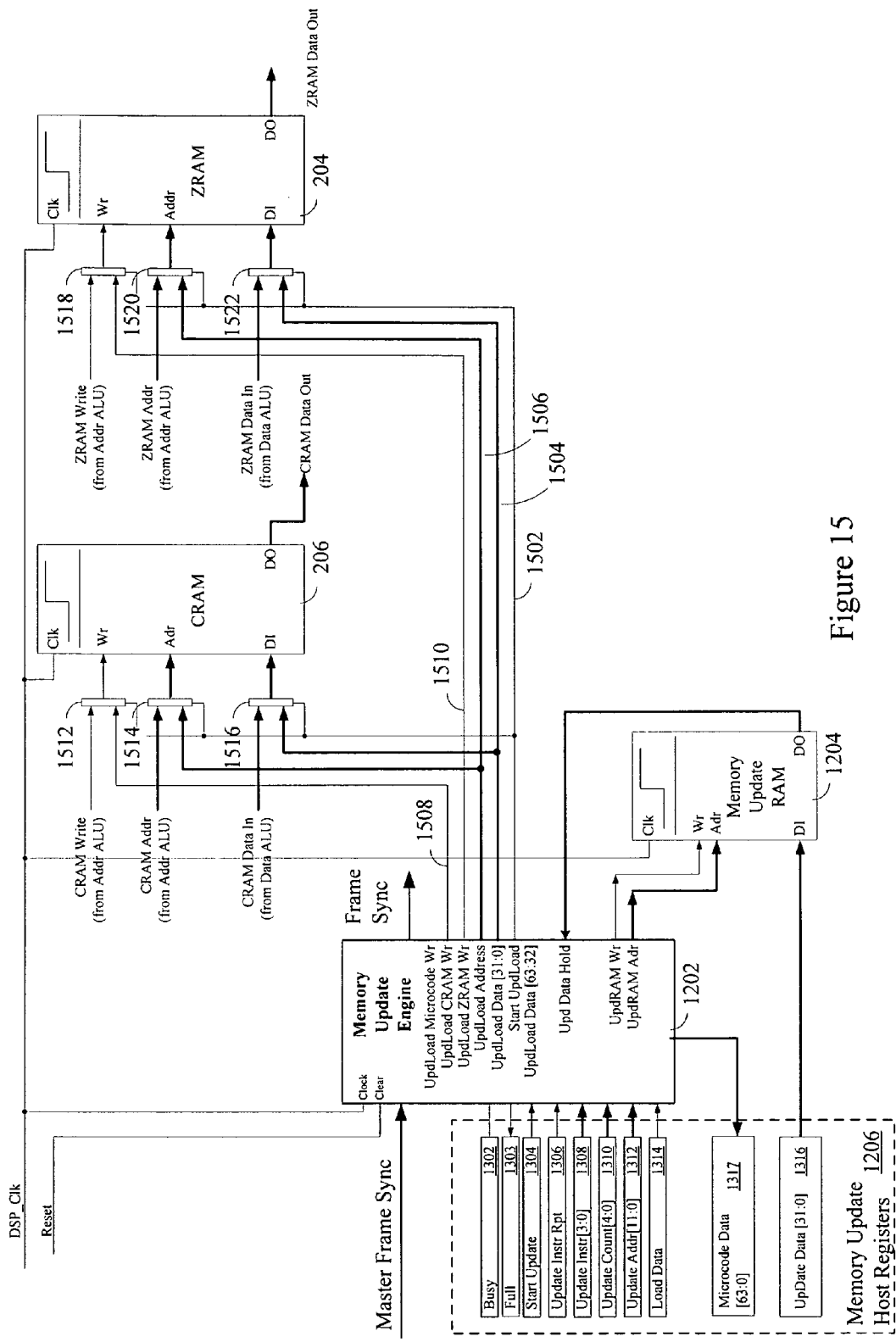

FIG. 15 shows the memory update engine 1202 interfaced to the Z-RAM 204 and C-RAM 206. The start upload signal 1502 provides a multiplexer control signal that selects the memory update data signals 1504 and the memory update address signals 1506 for application to the C-RAM 206 and Z-RAM 204. In addition, depending on the memory selected by the update instruction register 1308, the memory update engine asserts either the C-RAM write signal 1508 or the Z-RAM write signal 1510.

The C-RAM 206 and the Z-RAM 204 are generally accessible by the pipeline architecture 100 described above. Accordingly, the processor provides a mechanism for passing update data to the C-RAM 206 and Z-RAM 204. In particular, the processor implements multiplexer selection logic for the signals applied to the C-RAM 206 and Z-RAM 204. As shown in FIG. 15, the multiplexer selection logic includes a C-RAM write signal multiplexer 1512, a C-RAM address signal multiplexer 1514, and a C-RAM data multiplexer 1516. The multiplexer selection logic also includes a Z-RAM write signal multiplexer 1518, a Z-RAM address signal multiplexer 1520, and a Z-RAM data multiplexer 1522. The multiplexer selection logic is responsive to the start upload signal 1502 to select address, data, and write signals generated by the memory update engine 1202 for application to the C-RAM 206 and Z-RAM 204.

Figure 16:
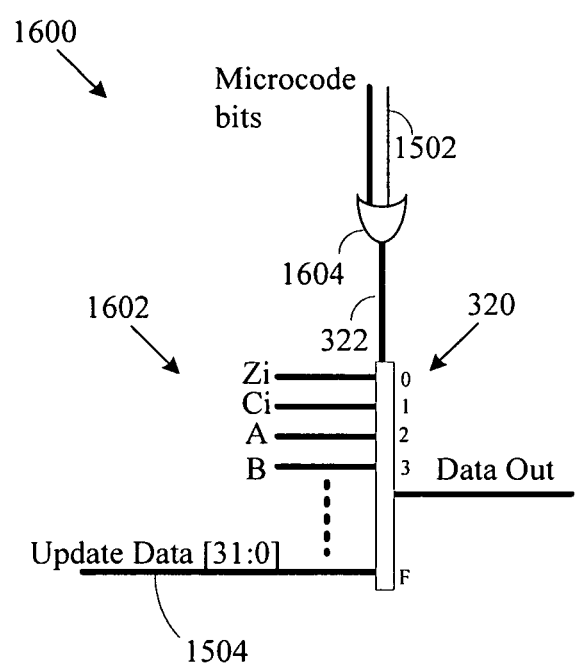

FIG. 16 illustrates one example of data override logic 1600 for applying the update data on the memory update data signals 1504 to the C-RAM 206 and Z-RAM 204. In the example shown in FIG. 16, the CZ data multiplexer 320 includes multiple inputs 1602, including an input for the memory update data signals 1504. The update data signals 1504 are provided on input 15 of the CZ data multiplexer 320. An OR gate 1604 responds to the start upload signal 1502 by forcing the multiplexer selection input 322 to all '1's, thereby selecting input 15 (i.e., the update data signals 1504) for output to the C-RAM 206 and Z-RAM 204. Thus, the CZ data multiplexer 320 may implement the functionality of the C-RAM data multiplexer 1516 and the Z-RAM data multiplexer 1522.

Similarly, override logic may be provided for the memory update address signals 1506 and for the write signals 1508 and 1510. For example, the address signal multiplexers 350 and 354 and the write signal multiplexers 352 and 356 shown in FIG. 3 may be extended to provide inputs for the memory update address signals 1506 and for the write signals 1508 and 1510. Address and write override logic may be provided to select the memory update address signals 1506 and the write signals 1508 and 1510 for application to the Z-RAM 204 and C-RAM 206 when the memory update engine 1202 asserts the start upload signal 1502.

Figure 17:
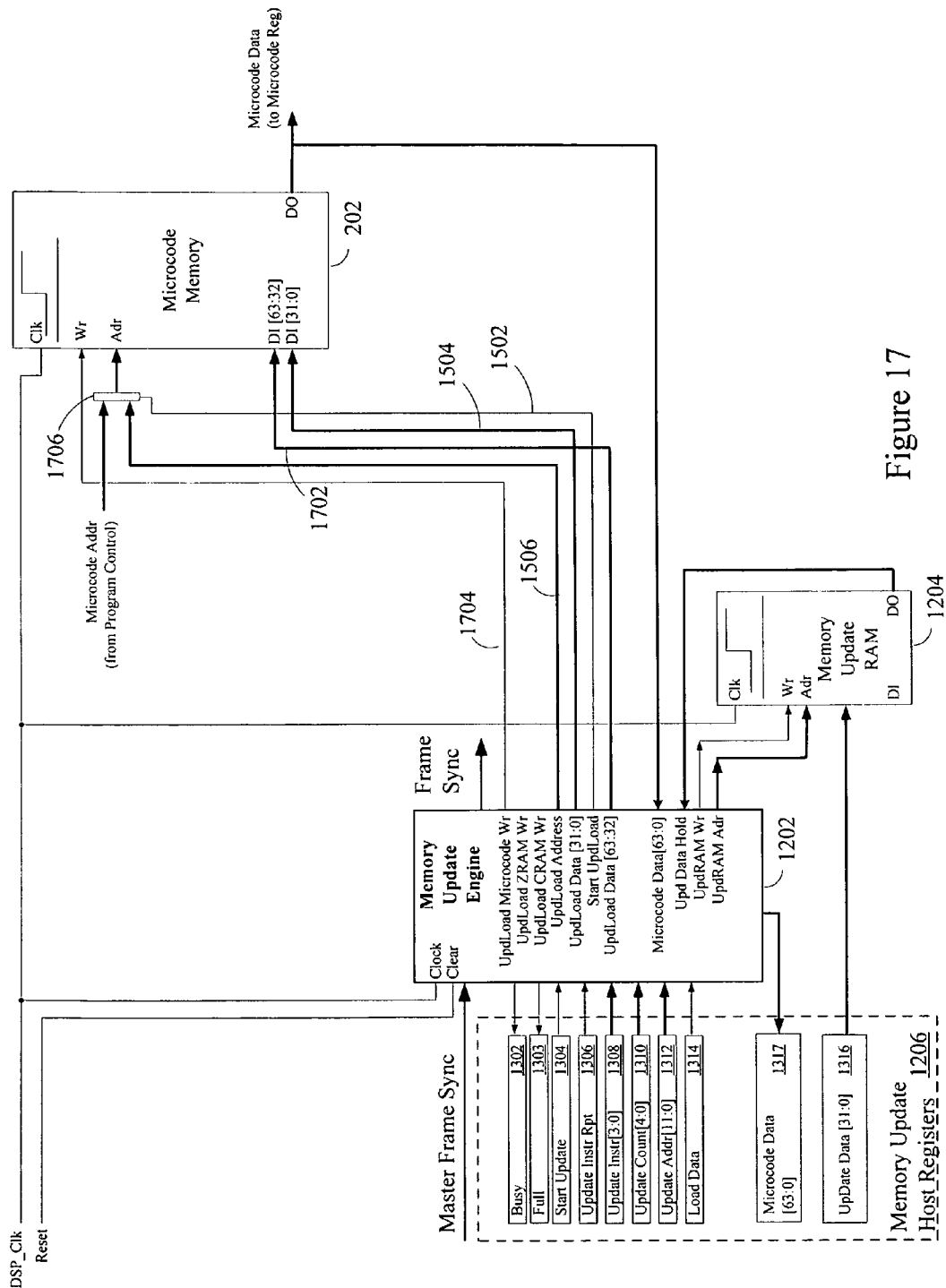

FIG. 17 shows the memory update engine 1202 interfaced to the microcode memory 202. In particular, FIG. 17 shows that the memory update engine 1202 provides a 64-bit microcode instruction to the microcode memory 202 on the memory update data signals 1504 (for the lower 32-bits of the instruction) and on the supplemental data signals 1702 (for the upper 32-bits of the instruction). The memory update engine 1202 asserts the microcode write signal 1704 to write the 64-bit microcode instruction to the microcode memory 202.

A microcode address selection multiplexer 1706 determines which address signals are applied to the microcode update memory 202. Under control of the start upload signal 1502, the microcode address selection multiplexer 1706 selects between an address generated by the address ALU 210 and the memory update engine 1202. When the memory update engine 1202 is used with the pipeline architecture 100, the address selection multiplexer 1706 may be added prior to the address input to the microcode memory 202 shown in FIG. 10.

The architecture 100 and memory update engine 1202 may be implemented utilizing software, for example, in the form of a hardware emulator program that includes instructions that emulate the operations described above, including the acts discussed with respect to FIGS. 11 and 14. Accordingly, the architecture 100 or engine 1202 may be represented in a machine readable memory such as RAM, ROM, Compact Disc or other memory. For example, a program stored in a machine readable memory may emulate the architecture 100 or engine 1202.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A processor whose architecture comprises:
   an instruction data pipeline comprising multiple data pipeline stages, each data pipeline stage corresponding to a discrete set of processing for a program instruction, the multiple data pipeline stages connected in series to provide start to finish processing data for the program instruction by propagating instruction data corresponding to the program instruction through the multiple data pipeline stages of the instruction data pipeline;

a digital signal processor (DSP) configured to sequentially load a first data pipeline stage of the instruction data pipeline with instruction data from program instructions in different programs from a set of multiple interleaved programs such that at any instant in time at least one of the multiple data pipeline stages is loaded with instruction data corresponding to another program instruction from one of the multiple interleaved programs and at least another one of the multiple data pipeline stages is loaded with instruction data corresponding to another program instruction from a different one of the multiple interleaved programs; and a machine state pipeline comprising multiple machine states, each machine state configured to store state data relating to a corresponding one of the multiple data pipeline stages, the machine state pipeline configured to propagate the state data for each of the multiple data pipeline stages sequentially through the multiple machine states in synchronism with the corresponding instruction data as it propagates through the data instruction pipeline such that the propagation of the instruction data and corresponding machine states through the data instruction pipeline and machine state pipeline results in the execution of one of the program instructions of one of the multiple interleaved programs.

2. The processor of claim 1, further comprising:
a microcode memory coupled to the instruction data pipeline and to the machine state pipeline.

3. The processor of claim 1, where the instruction data pipeline comprises a phase 2 data pipeline stage.

4. The processor of claim 1, where the instruction data pipeline comprises a phase 3 data pipeline stage.

5. The processor of claim 1, where the instruction data pipeline comprises a phase 'n' data pipeline stage coupled back to a phase 1 data pipeline stage.

6. The processor of claim 1, where the instruction data pipeline comprises:
a phase 1 data pipeline stage serially coupled to a phase 2 data pipeline stage serially coupled to a phase 3 data pipeline stage serially coupled through 'n'-3 additional data pipeline stages to a phase 'n' data pipeline stage coupled back to the phase 1 pipeline stage.

7. The processor of claim 1, where the machine state pipeline comprises a phase 2 machine state.

8. The processor of claim 1, where the machine state pipeline comprises a phase 3 machine state.

9. The processor of claim 1, where the machine state pipeline comprises a phase 'n' machine state coupled back to a phase 1 machine state.

10. The processor of claim 1, where the machine state pipeline comprises:
a phase 1 machine state serially coupled to a phase 2 machine state serially coupled to a phase 3 machine state serially coupled through. 'n'-3 machine states to a phase 'n' machine state coupled back to the phase 1 machine state.

11. The processor of claim 1, where the machine state pipeline comprises accumulator registers.

12. The processor of claim 11, where the accumulator registers are operable to propagate accumulator state data for at least two different accumulators.

13. The processor of claim 11, where the accumulator registers comprise a phase 1 accumulator register and a phase 2 accumulator register.

14. The processor of claim 1, where the machine state pipeline comprises flag registers.

15. The processor of claim 1, where the machine state pipeline comprises program counter registers;
where the machine state pipeline propagates program counter data of a first program of the multiple interleaved programs through the program counter registers in synchronism with instruction data of the first program; and
where the machine state pipeline propagates program counter data of a second program of the multiple interleaved programs through the program counter registers in synchronism with instruction data of the second program.

16. The processor of claim 15, further comprising program counter reset logic coupled to at least one of the program counter registers and operable to load a program counter value in response to a synchronization signal.

17. The processor of claim 1, where the machine state pipeline comprises loop registers.

18. The processor of claim 1, where the machine state pipeline comprises microcode registers.

19. The processor of claim 1, where the state data that propagates through the machine state pipeline comprises first program counter data for an instruction of a first program of the multiple interleaved programs and second program counter data for an instruction of a second program of the multiple interleaved programs, and where the instruction data comprises first instruction data for the first program and second instruction data for the second program;
where the machine state pipeline propagates the first program counter data in synchronism with the first instruction data; and
where the machine state pipeline propagates the second program counter data in synchronism with the second instruction data.

20. The processor of claim 1, where the state data that propagates through the machine state pipeline comprises first context data that indicates a machine state applicable to an instruction of a first program of the multiple interleaved programs and second context data that indicates a machine state applicable to an instruction of a second program of the multiple interleaved programs;
where the instruction data that propagates through the instruction data pipeline comprises first instruction data for the first program and second instruction data for the second program;
where the machine state pipeline propagates the first context data in synchronism with the first instruction data to provide an execution context for the first instruction data that propagates through the instruction data pipeline; and
where the machine state pipeline propagates the second context data in synchronism. with the second instruction data to provide an execution context for the second instruction data that propagates through the instruction data pipeline.

21. The processor of claim 1, where a first instruction of a first program of the multiple interleaved programs propagates through and exits the instruction data pipeline before the instruction data pipeline accepts a next instruction of the first program; and
where between accepting the first instruction of the first program and the next instruction of the first program, the instruction data pipeline accepts and processes an additional instruction from a second program of the multiple interleaved programs.

22. The processor of claim 1, where the state data that propagates through the machine state pipeline comprises first context data that indicates a machine state applicable to an instruction of a first program of the multiple interleaved programs and second context data that indicates a machine state applicable to an instruction of a second program of the multiple interleaved programs;
   where the instruction data that propagates through the instruction data pipeline comprises first instruction data for the first program and second instruction data for the second program;
   where the machine state pipeline propagates the first context data in synchronism with the first instruction data to provide an execution context for the instruction of the first instruction data that propagates through the instruction data pipeline; and
   where the machine state pipeline propagates the second context data in synchronism with the second instruction data to provide an execution context for the instruction of the second instruction data that propagates through the instruction data pipeline.

23. The processor of claim 1, where a first instruction of a first program of the multiple interleaved programs propagates through and exits the instruction data pipeline before the instruction data pipeline accepts a next instruction of the first program; and
   where between accepting the first instruction of the first program and the next instruction of the first program, the instruction data pipeline accepts and processes an additional instruction from a second program of the multiple interleaved programs.

24. A method for processing data, the method comprising:
   sequentially loading a common instruction data pipeline in a processor with instruction data from program instructions in different programs from multiple interleaved programs, the common instruction data pipeline comprising multiple data pipeline stages, each data pipeline stage corresponding, to a discrete set of processing for the program instruction, the multiple data pipeline states connected in series to provide start to finish processing data for the program instruction;
   propagating the instruction data through the multiple serially coupled data pipeline stages of the common instruction data pipeline, such that at any instant in time, at least one of the multiple data pipeline stages is loaded with instruction data corresponding to a program instruction from one of the multiple interleaved programs and at least another one of the multiple data pipeline stages is loaded with instruction data corresponding to another program instruction from a different one of the multiple interleaved programs,
   propagating state data for the instruction data in each of the data pipeline stages through a machine state pipeline in the processor, the machine state pipeline comprising a series of machine states each corresponding to one of the data pipeline stages, where the state data is updated at each machine state according to the discrete set of processing at each corresponding data pipeline stage; and
   performing discrete set of processing at each data pipeline stage in context of the corresponding propagated state data.

25. The method of claim 24, where propagating instruction data comprises:
   propagating the instruction data through a phase 2 data pipeline stage of the instruction data pipeline.

26. The method of claim 24, where propagating state data comprises:
   propagating the state data through a phase 2 machine state of the machine state pipeline.

27. The method of claim 24, where propagating state data comprises:
   propagating microcode state data.

28. The method of claim 24, where propagating state data comprises:
   propagating program counter data of a first program of the multiple interleaved programs through the machine state pipeline in synchronism with instruction data of the first program; and
   propagating program counter data of a second program of the multiple interleaved programs through the machine state pipeline in synchronism with instruction data of the second program.

29. The method of claim 28, further comprising:
   storing the program counter data of the first and second programs in program counter registers as the program counter data propagates through the machine state pipeline; and
   independently resetting the program counter registers.

30. The method of claim 24, where the state data that propagates through the machine state pipeline comprises first context data that indicates a machine state applicable to an instruction of a first program of the multiple interleaved programs and second context data that indicates a machine state applicable to an instruction of a second program of the multiple interleaved programs, where the instruction data that propagates through the instruction data pipeline comprises first instruction data for the first program and second instruction data for the second program, and where the act of propagating state data comprises:
   propagating the first context data in synchronism with the first instruction data to provide an execution context for the instruction of the first instruction data that propagates through the instruction data pipeline; and
   propagating the second context data in synchronism with the second instruction data to provide an execution context for the instruction of the second instruction data that propagates through the instruction data pipeline.

31. The method of claim 24, where propagating instruction data comprises:
   propagating a first instruction of a first program of the multiple interleaved programs completely through the instruction data pipeline before accepting a next instruction of the first program; and
   accepting and processing an additional instruction from a second program of the 'n' interleaved programs between accepting the first instruction of the first program and the next instruction of the first program.

* * * * *